United States Patent
Cha et al.

(10) Patent No.: US 10,929,729 B2
(45) Date of Patent: Feb. 23, 2021

(54) SOLID STATE DRIVE APPARATUSES WITH ATTACHED LABELS AND OVERLAPPING IMAGE MARKING

(71) Applicant: Samsung Electronics Co., Ltd., Suwon-si (KR)

(72) Inventors: Ji-hye Cha, Hwaseong-si (KR); Beom-jun Kim, Seoul (KR); Nam-ho Song, Uiwang-si (KR); Sung-woo Joo, Suwon-si (KR)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 15/870,037

(22) Filed: Jan. 12, 2018

(65) Prior Publication Data
US 2018/0365543 A1 Dec. 20, 2018

(30) Foreign Application Priority Data
Jun. 15, 2017 (KR) .......................... 10-2017-0075817

(51) Int. Cl.
| | | |
|---|---|---|
| *G06K 19/02* | (2006.01) | |
| *G06K 19/06* | (2006.01) | |
| *G06F 21/78* | (2013.01) | |
| *G06F 3/00* | (2006.01) | |
| *G06F 21/36* | (2013.01) | |
| *G06Q 30/00* | (2012.01) | |

(52) U.S. Cl.
CPC ............. *G06K 19/025* (2013.01); *G06F 3/00* (2013.01); *G06F 21/36* (2013.01); *G06F 21/78* (2013.01); *G06K 19/06028* (2013.01); *G06K 19/06037* (2013.01); *G06Q 30/0185* (2013.01)

(58) Field of Classification Search
USPC ......................................................... 235/385
See application file for complete search history.

(56) References Cited

U.S. PATENT DOCUMENTS

| | | |
|---|---|---|
| 6,447,014 B1 | 9/2002 | Seidl |
| 7,450,011 B2 | 11/2008 | Duschek |
| 10,565,485 B2 | 2/2020 | Albinyana et al. |
| 2005/0147794 A1 | 7/2005 | Huang |
| 2008/0089020 A1* | 4/2008 | Hiew .................. H05K 9/0067 361/679.31 |
| 2009/0200790 A1 | 8/2009 | Kanno et al. |
| 2013/0207375 A1 | 8/2013 | Eichenberger et al. |
| 2013/0292934 A1 | 11/2013 | Newman |
| 2017/0323121 A1* | 11/2017 | Liu ........................ G06F 21/57 |
| 2017/0323191 A1* | 11/2017 | Pascua ............. G06K 19/07381 |

FOREIGN PATENT DOCUMENTS

| | | |
|---|---|---|
| CN | 1366676 A | 8/2002 |
| CN | 101425324 A | 5/2009 |
| CN | 103228458 A | 7/2013 |
| CN | 106415592 A | 2/2017 |
| KR | 100663274 B1 | 1/2007 |

(Continued)

*Primary Examiner* — Rafferty D Kelly
(74) *Attorney, Agent, or Firm* — Myers Bigel, P.A.

(57) ABSTRACT

A solid state drive apparatus may include a main body including a semiconductor device, a label attached to a first portion of an exterior surface of the main body such that a second portion of the exterior surface of the main body is free of the label, and an information marking on the label and on the second portion of the exterior surface of the main body.

10 Claims, 29 Drawing Sheets

(56) References Cited

FOREIGN PATENT DOCUMENTS

| | | |
|---|---|---|
| KR | 1020070006090 A | 1/2007 |
| KR | 1020110128218 A | 11/2011 |
| KR | 1020120041429 A | 5/2012 |
| KR | 1020130000263 A | 1/2013 |
| KR | 1020130001564 A | 1/2013 |
| KR | 101377663 B1 | 3/2014 |

\* cited by examiner

SOLID STATE DRIVE APPARATUSES WITH ATTACHED LABELS AND OVERLAPPING IMAGE MARKING

CROSS-REFERENCE TO RELATED APPLICATION

This application claims priority under 35 U.S.C. § 119 to Korean Patent Application No. 10-2017-0075817, filed on Jun. 15, 2017 in the Korean Intellectual Property Office, the entire contents of which are incorporated herein in their entirety by reference.

BACKGROUND

Embodiments of the inventive concepts relate to solid state drive apparatuses, and more particularly, to solid state drive apparatuses with attached labels.

Solid state drives are gaining attention as a next-generation storage device to replace conventional hard disk drives. Solid state drives are storage devices based on non-volatile memory devices and may have lower power consumption and higher storage density than some conventional hard disk drives. When using solid state drives as storage devices, it may be possible to input and output a large amount of data at a high speed, which may result in an increased demand.

Solid state drives may be available in a variety of products that have different storage capacities. A solid state drive apparatus may include a label including product information, such as storage capacity, attached thereto. However, the label may be removed and a fake label including false product information, such as a false storage capacity, may be attached to the solid state drive apparatus. It may not be easy to recognize the fake label including the false product information. Accordingly, consumers may be fooled by the fake label.

SUMMARY

Some embodiments of the inventive concepts may provide solid state drive apparatuses capable of preventing forgery of information on a product.

According to some embodiments of the inventive concepts, solid state drive apparatuses are provided. A solid state drive apparatus may include a main body including a semiconductor device, a label attached to a first portion of an exterior surface of the main body such that a second portion of the exterior surface of the main body is free of the label, and an information marking on the label and on the second portion of the exterior surface of the main body.

According to some embodiments of the inventive concepts, solid state drive apparatuses are provided. A solid state drive apparatus may include a main body including a semiconductor device, a sticker attached to a first portion of an exterior surface of the main body by an adhesive such that a second portion of the exterior surface of the main body is free of the sticker. The sticker may display a first information corresponding to a storage capacity of the solid state drive apparatus. The solid state drive apparatus may include an information marking on the sticker and on the second portion of the exterior surface of the main body. The information marking may display a second information corresponding to the storage capacity of the solid state drive apparatus.

According to some embodiments of the inventive concepts, solid state drive apparatuses may be provided. A solid state drive apparatus may include a substrate, a non-volatile memory device on the substrate, a housing configured to house the substrate, and a label attached to a first portion of an upper exterior surface of the housing such that a second portion of the upper exterior surface of the housing is free of the label. The label may display a first information corresponding to a storage capacity of the solid state drive apparatus. The solid state drive apparatus may include an information marking including a first marking portion on the second portion of the upper exterior surface of the housing and including a second marking portion on the label. At least a portion of the second marking portion may be connected to the first marking portion.

BRIEF DESCRIPTION OF THE DRAWINGS

Embodiments of the inventive concepts will be more clearly understood in view of the detailed description and the accompanying drawings.

DETAILED DESCRIPTION OF THE EMBODIMENTS

Figure 1:
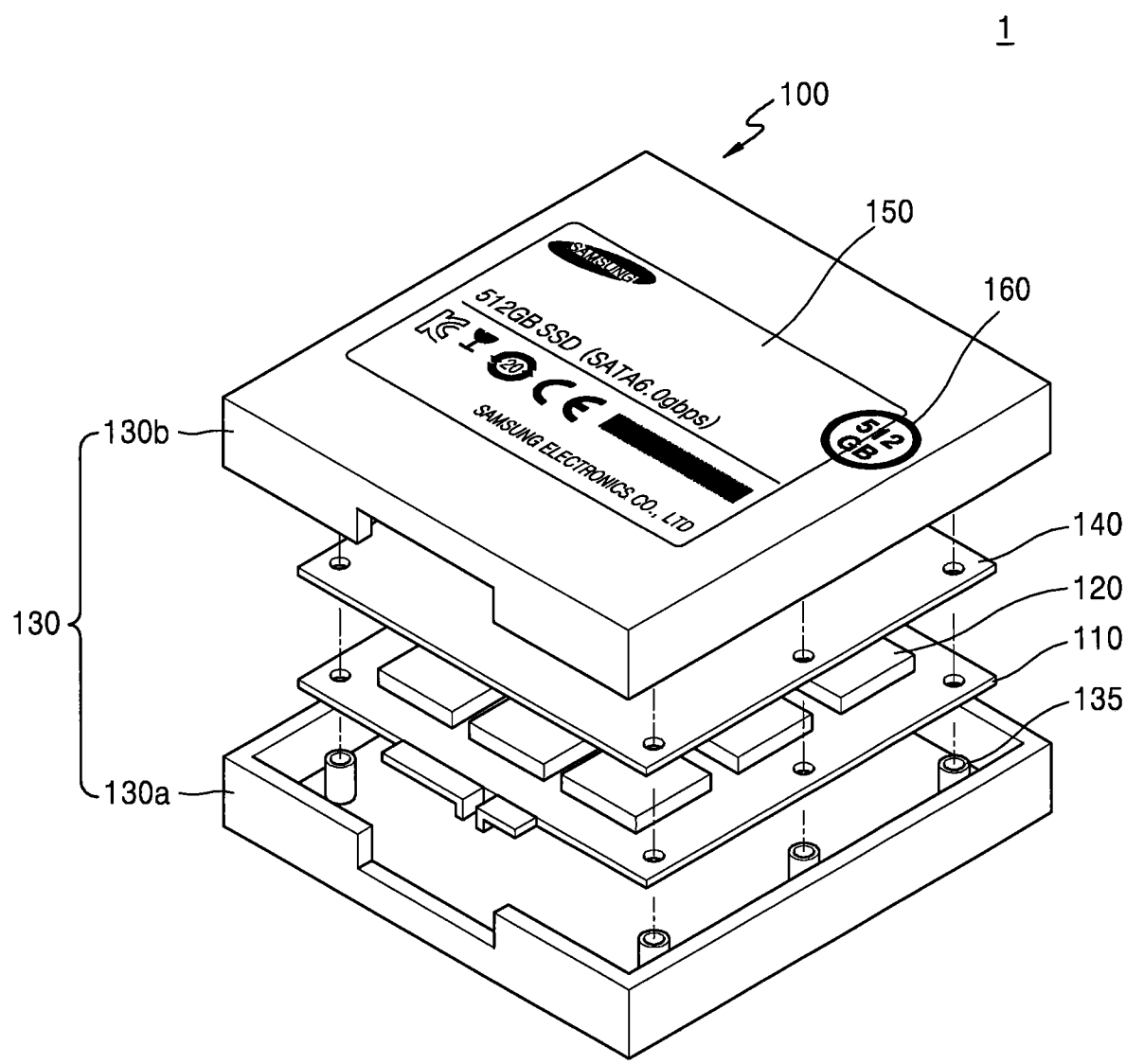
FIG. 1 is an exploded perspective view illustrating a solid state drive apparatus according to some embodiments of the inventive concepts.

FIG. 1 is an exploded perspective view illustrating a solid state drive apparatus according to some embodiments of the inventive concepts.

Referring to FIG. 1, a solid state drive apparatus 1 may include a substrate 110 on which one or more semiconductor devices 120 are mounted and a housing 130 for housing the substrate 110. In some embodiments, the solid state drive apparatus 1 may further include a heat conduction plate 140 between the semiconductor device 120 and the housing 130.

The substrate 110 may include, for example, a printed circuit board (PCB) or a flexible PCB (FPCB). The semiconductor devices 120 mounted on the substrate 110 may include a controller chip for controlling an operation of the solid state drive apparatus 1. The semiconductor devices 120 may include a non-volatile memory device, or a volatile memory device and a non-volatile memory device. The volatile memory device may be, but is not limited to, DRAM, SRAM, SDRAM, DDR RAM, RDRAM, or the like. The non-volatile memory device may be, but is not limited thereto, a flash memory, phase-change RAM (PRAM), resistive RAM (RRAM), ferroelectric RAM (Fe-RAM), magnetic RAM (MRAM), or the like. The flash memory may be, for example, a NAND flash memory. The flash memory may be, for example, a V-NAND flash memory. Ones of the non-volatile memory devices may include one or more semiconductor dies, which may be in a stack.

A controller may be incorporated inside the controller chip. The controller may control access to data stored in the non-volatile memory device. In other words, the controller may control a write/read operation of the non-volatile memory device, e.g., a flash memory, according to a control command of an external host. The controller may include a separate semiconductor chip such as an application specific integrated circuit (ASIC). The controller may be configured to be automatically executed by an operation system of an external host, for example, when the solid state drive apparatus 1 is connected to the external host. The controller may communicate using a standard protocol such as parallel advanced technology attachment (PATA), serial advanced technology attachment (SATA), SCSI, or PCI Express (PCIe). In addition, the controller may perform operations of wear leveling, garbage collection, bad block management, and Error Correcting Code (ECC) for the non-volatile memory device. In this case, the controller may include a script for automatic start and an application program executable on the external host.

The volatile memory device may provide a cache function that stores data used when the external host accesses the solid state drive apparatus 1 so that access time and data-transfer performance may be scaled according to the process performance of the external host connected to the solid state drive apparatus 1.

On the substrate 110, active or passive components such as chip resistors, chip capacitors, inductors, switches, temperature sensors, DC-DC converters, and/or quartz or voltage regulators for clock generation may be further mounted.

A connector may be attached to one end of the substrate 110. The connector may connect the solid state drive apparatus 1 to an external host and then transmit and receive signals, and/or power supplied thereto. The connector may include a plurality of wiring lines. The connector may be, for example, a connector configured to be connected to an external device according to a PATA standard, a SATA standard, a SCSI standard, or a PCIe standard. Here, a SATA standard may refer to any SATA-based standard, for example SATA-2, SATA-3, external SATA (e-SATA), or SATA-1. A PCIe standard may include any PCIe-based standard, for example PCIe 2.0, PCIe 2.1, PCIe 3.0, PCIe 4.0, or PCIe 1.0. A SCSI standard may include any SCSI-based standard, for example parallel SCSI, serial attached SA-SCSI (SAS), or iSCSI.

The semiconductor device 120 may be mounted on the substrate 110 by a ball grid array (BGA) method, a pin grid array (PGA) method, a tape carrier package (TCP) method, a chip-on-board (COB) method, a quad flat non-leaded (QFN) method, a quad flat package (QFP) method, or the like. However, the inventive concepts are not limited thereto.

The substrate 110, on which the semiconductor device 120 is mounted, may be housed within the housing 130, and the housing 130 may include a first sub-housing 130a and a second sub-housing 130b. The housing 130 may include a material that well dissipates the heat generated therein and has sufficient strength to protect the electronic components housed therein. The housing 130 may include metal, for example, copper, tin, zinc, aluminum, stainless steel, or the like but is not limited thereto.

Although FIG. 1 illustrates a boundary between the first sub-housing 130a and the second sub-housing 130b at the center of the housing 130 in a vertical direction, the boundary therebetween may be on a lower surface or a lower portion of the housing 130. Alternatively, the boundary may be on an upper surface or an upper portion of the housing 130.

The housing 130 may be thermally connected to a fixing portion 135 that may be used to affix the substrate 110. The thermal connection between the housing 130 and the fixing portion 135 may allow the heat of the fixing portion 135 to be transferred to the housing 130 or vice versa by connecting the housing 130 and the fixing portion 135 with or without other components therebetween.

FIG. 1 illustrates the fixing portion 135 as a coupling boss but is not limited to. The fixing portion 135 may be another fixing portion. The substrate 110 and the heat conduction plate 140 may include holes for being engaged with the fixing portion 135.

The heat conduction plate 140 may include a material having a higher thermal conductivity than the substrate 110. For example, the heat conduction plate 140 may include a metal, a carbon-based material, or a combination thereof. For example, the metal may include, but is not limited to, copper (Cu), aluminum (Al), zinc (Zn), tin (Sn), stainless steel, or the like. The carbon-based material may include, but is not limited to, graphite, graphene, carbon fiber, carbon nanotube (CNT) composite, or the like. The heat conduction plate 140 may be fixed to the fixing portion 135 together with the substrate 110.

Heat generated in the semiconductor device 120 may be transferred to the heat conduction plate 140 by convection or conduction. The semiconductor device 120 and the heat conduction plate 140 may be spaced apart from each other or may be in contact with each other. When the semiconductor device 120 and the heat conduction plate 140 are spaced apart from each other, heat may be transferred from the semiconductor device 120 to the heat conduction plate 140 by convection of air therebetween. When the semiconductor device 120 and the heat conduction plate 140 are in contact with each other, heat may be transferred from the semiconductor device 120 to the heat conduction plate 140 by conduction.

The heat transferred to the heat conduction plate 140 may be transferred to the housing 130 through the fixing portion 135. At least some portions of the fixing portion 135 may include a material having a higher thermal conductivity than the heat conduction plate 140 to rapidly transfer such heat to the housing 130.

For example, the fixing portion 135 may be formed as an integral body with a lower plane of the housing 130 or may be formed separately from the lower plane thereof. A material of the fixing portion 135 may be the same as or different from a material included in the lower plane of the housing 130. For example, the substrate 110 and the heat conduction plate 140 may be coupled to the fixing portion 135 by threaded connection.

A label 150 may be attached to an exterior upper surface of the housing 130, for example an exterior upper surface of the second sub-housing 130b. The label 150 may be, for example, a sticker with an adhesive. In some embodiments, the label 150 may be a void label. Information on a product, that is, the solid state drive apparatus 1, may be printed on the label 150. The information printed on the label 150 may include a product name, storage capacity, a model name, a manufacturer name, a manufacturer logo, a manufacturer or product homepage, a serial number (S/N), a part number (P/N), a firmware number, a certification mark, an interface type, an operation condition, country of manufacturer, cautions, guidance, or the like. In some embodiments, the label 150 may be attached to an exterior lower surface or an exterior side surface of the housing 130.

An information marking 160 may be displayed on the exterior upper surface of the housing 130. A first portion of the information marking 160 may be on the label 150 and a second portion of the information marking 160 may be on a portion of the exterior upper surface of the housing 130 that is free of the label 150, i.e., where the label 150 is not attached. The information marking 160 may include, for example, information on storage capacity. The information marking 160 may include, for example, at least one of numbers, letters, numbers and units, bar codes, and QR codes that contain information on storage capacity. In some embodiments, the information marking 160 may further include symbols and/or figures. The information marking 160 may be formed, for example, by a screen printing method, an imprint method, a roll off-set print method, or a laser marking method, or may be formed by filling a groove formed by a laser marking method with inks or paints. In some embodiments, the information marking 160 may be a void label.

A portion of the solid state drive apparatus 1 excluding the label 150 and the information marking 160 may be a main body 100. For example, the main body 100 of the solid state drive apparatus 1 may include the substrate 110, on which the semiconductor devices 120 are mounted, and the housing 130 for housing the substrate 110. In some embodiments, the main body 100 of the solid state drive apparatus 1 may further include the heat conduction plate 140 between the semiconductor device 120 and the housing 130. Therefore, the label 150 may be attached to an exterior surface of the main body 100 of the solid state drive apparatus 1, and the information marking 160 may be on the label 150 and on a portion of the exterior surface of the main body 100 of the solid state drive apparatus 1 where the label 150 is not attached.

Figure 2A:
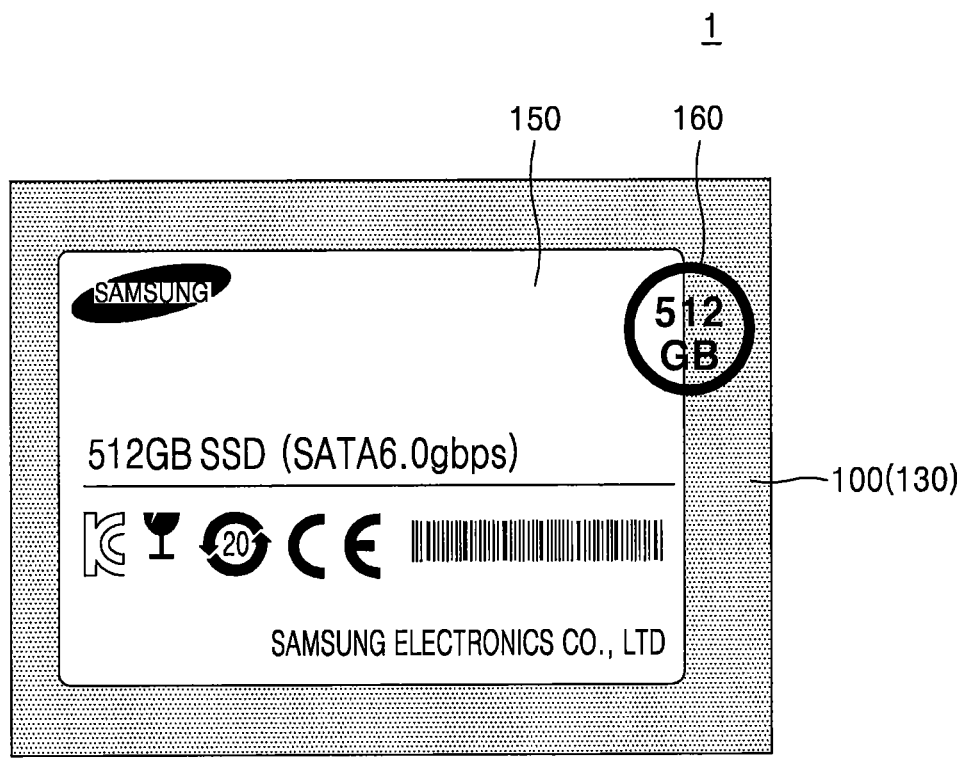
FIGS. 2A and 2B respectively are a top view and a cross-sectional view illustrating a solid state drive apparatus according to some embodiments of the inventive concepts.
Figure 2B:
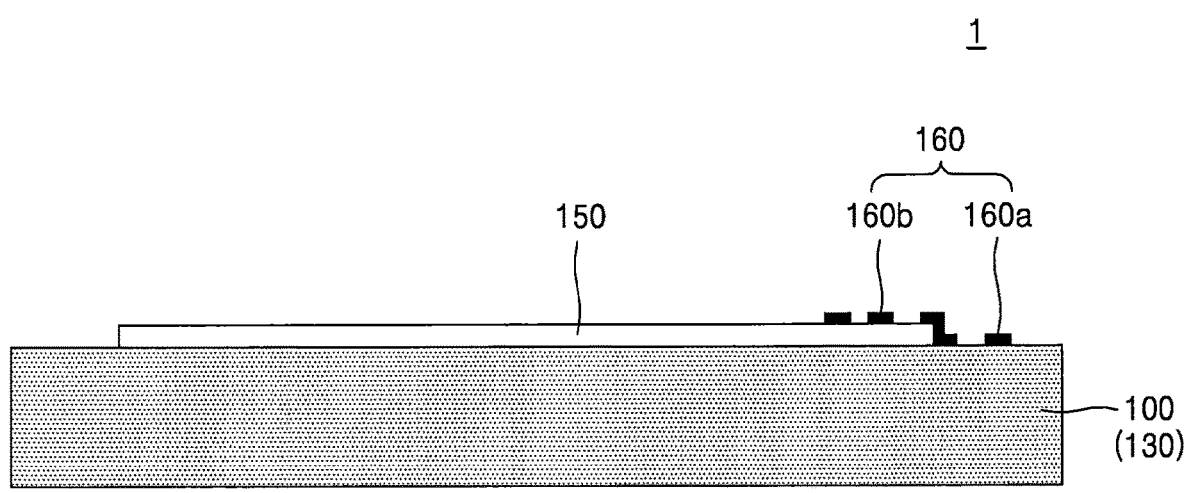

FIGS. 2A and 2B respectively are a top view and a cross-sectional view illustrating a solid state drive apparatus according to some embodiments of the inventive concepts.

Referring to FIGS. 2A and 2B, the solid state drive apparatus 1 may include the main body 100, the label 150 attached on the main body 100, and the information marking 160 on a portion of an exterior upper surface of the main body 100 where the label 150 is not attached, and on the label 150. The information marking 160 may include a first marking portion 160a on the exterior upper surface of the main body 100 and a second marking portion 160b on the label 150. At least some portions of the first marking portion 160a and the second marking portion 160b may be connected to each other. When the solid state drive apparatus 1 includes the housing 130, the label 150 may be attached on the housing 130, and the information marking 160 may be overlap the label 150 and overlap a portion of the exterior upper surface of the housing 130 where the label 150 is not attached.

In some embodiments, the first marking portion 160a may have a protruding shape with respect to a surface of the housing 130, and the second marking portion 160b may have a protruding shape with respect to a surface of the label 150. In some embodiments, the first marking portion 160a may have a groove extending into the exterior surface of the housing 130, and the second marking portion 160b may have a groove extending into the surface of the label 150.

The information marking 160 may be on a portion of the exterior upper surface of the main body 100 where the label 150 is not attached, and on the label 150. Therefore if the label 150 is removed from the main body 100, a portion of the information marking 160, that is, the first marking portion 160a, may remain on the exterior upper surface of the main body 100.

Figure 3A:
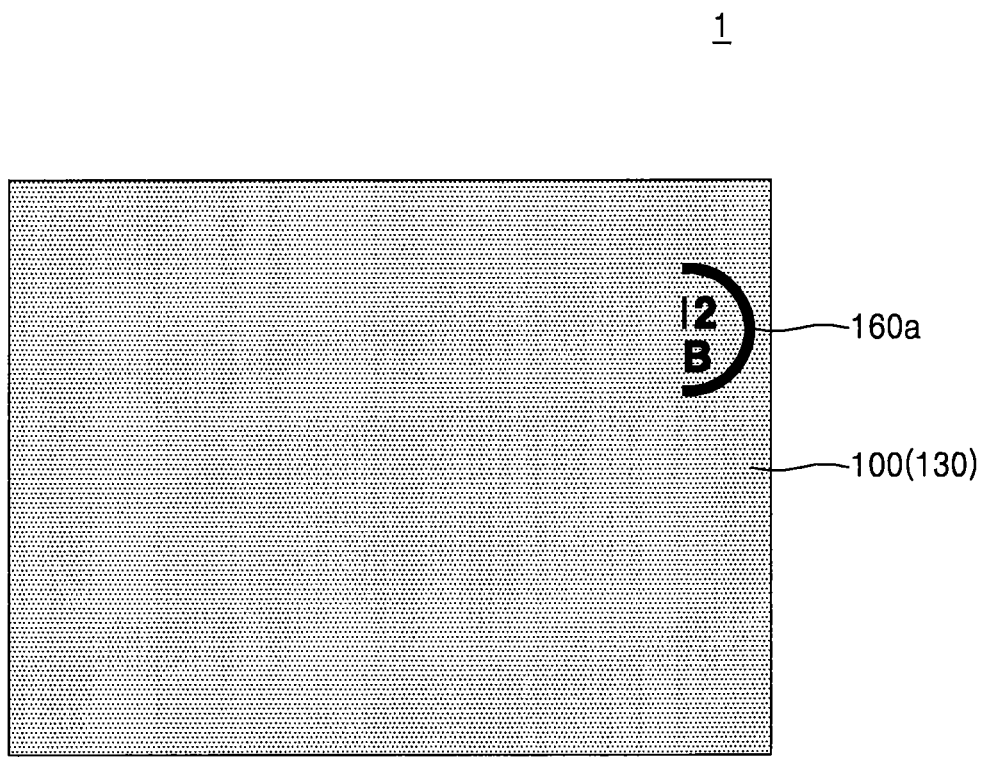
FIGS. 3A and 3B respectively are a top view and a cross-sectional view illustrating a state in which a label is removed from a solid state drive apparatus according to some embodiments of the inventive concepts.
Figure 3B:
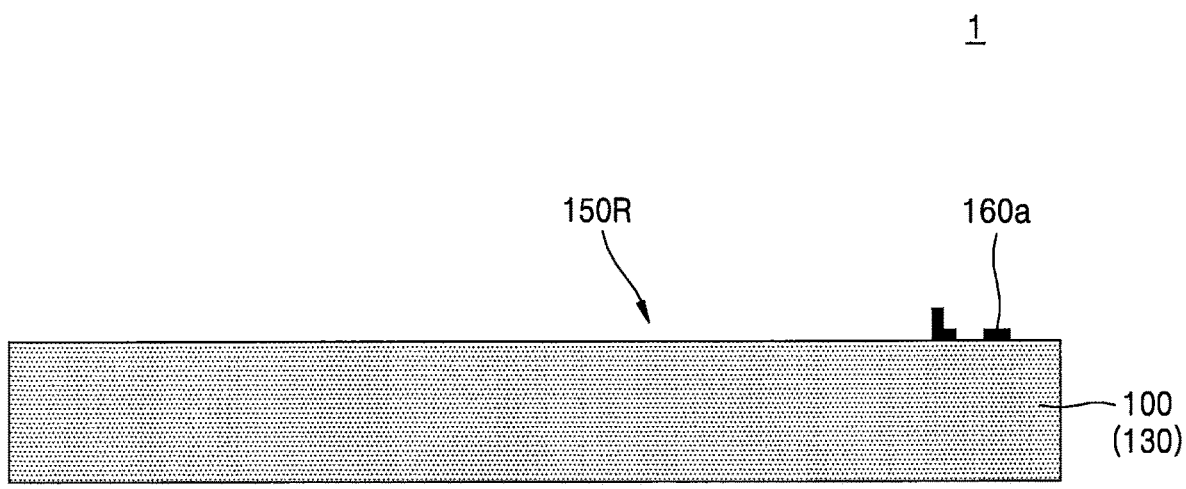

FIGS. 3A and 3B respectively are a top view and a cross-sectional view illustrating a state in which a label is removed from a solid state drive apparatus according to some embodiments of the inventive concepts.

Referring to FIGS. 2A to 3B, when the label 150 is removed from the solid state drive apparatus 1, only a portion of the information marking 160, that is, the first marking portion 160a, remains on the exterior upper surface of the main body 100, for example, the exterior upper surface of the housing 130. In detail, the second marking portion 160b of the information marking 160 may be removed with the label 150 when the label 150 is removed from the main body 100. Therefore, a portion of the information marking 160, that is, the second marking portion 160b, does not remain on a portion 150R of the exterior upper surface of the main body 100 where the label 150 is removed, and another portion of the information marking 160, that is, the first marking portion 160a, may remain on the exterior upper surface of the main body 100, adjacent to the portion 150R where the label 150 is removed. A part of information on storage capacity of the solid state drive apparatus 1 is left on the first marking portion 160a, and thus, when a fake label, on which false information on storage capacity is printed, is newly attached to the portion 150R where the label 150 is removed, it may be confirmed that a fake label is used by comparing the fake label with the first marking portion 160a.

In some embodiments, when the label 150 is removed from the solid state drive apparatus 1, some portions of the first marking portion 160a that contact the second marking portion 160b may also be removed.

In some embodiments, when the label 150 is a void label, some portions of the label 150 may remain as a void marking on the exterior upper surface of the main body 100, for example, the exterior upper surface of the housing 130.

In some embodiments, if the information marking 160 is a void label, some portions of the first marking portion 160a may be removed together with the label 150 when the label 150 is removed, and remaining portions of the first marking portion 160a may remain as a void marking on the exterior upper surface of the main body 100, for example, the exterior upper surface of the housing 130.

Figure 4A:
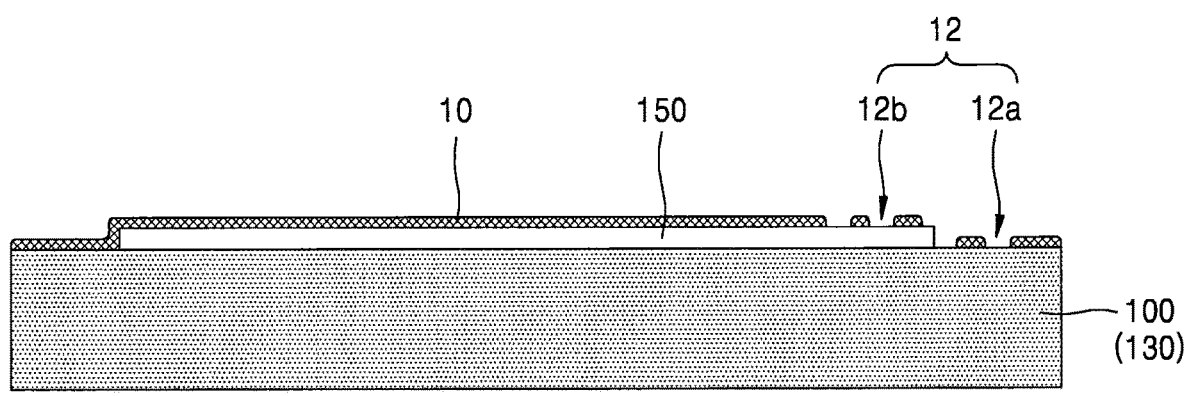
FIGS. 4A to 4C are cross-sectional views illustrating operations of methods of manufacturing a solid state drive apparatus, according to some embodiments of the inventive concepts.
Figure 4B:
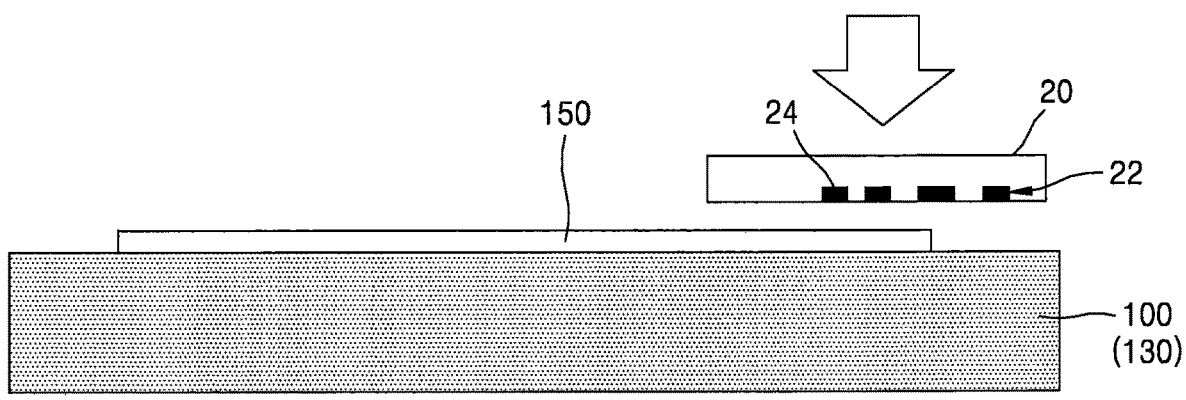
Figure 4C:
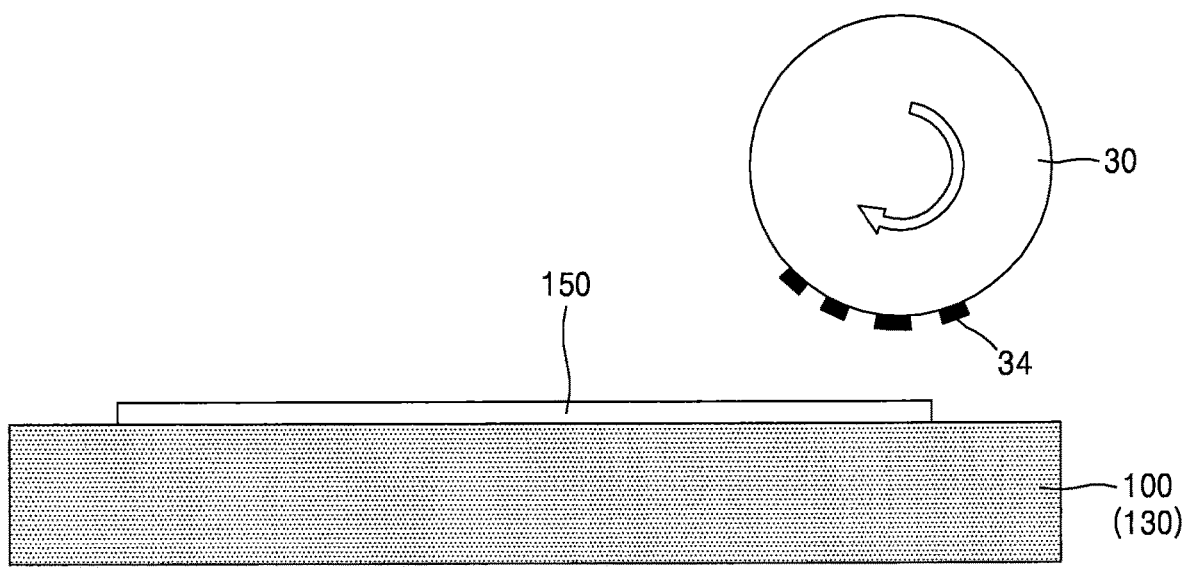

FIGS. 4A to 4C are cross-sectional views illustrating operations of methods of manufacturing a solid state drive apparatus, according to some embodiments of the inventive concepts.

Referring to FIG. 4A, the information marking 160 may be formed by a screen print method. In detail, a screen 10 covering the label 150 and the housing 130 may be disposed on the main body 100, on which the label 150 is attached, for example, the housing 130. The screen 10 may be disposed on the main body 100, where the label 150 is attached, to be adhesive to the label 150 and the main body 100. The screen 10 may also be referred to as a mesh. The screen 10 may include mesh openings 12 exposing some portions of the exterior upper surface of the main body 100 and some portions of the label 150. The mesh openings 12 may include a first opening 12a exposing some portions of the exterior upper surface of the main body 100 and a second opening 12b exposing some portions of the label 150. In some embodiments, the first opening 12a and the second opening 12b may be connected.

The screen 10 may include a material that is impermeable to ink. The screen 10 may include, for example, synthetic fibers such as polyester or nylon. In some embodiments, the screen 10 may include a metal such as stainless steel.

Next, ink may be applied to an upper surface of the screen 10, and then the mesh openings 12 may be filled with ink, for example using a blade or a squeegee, to form the information marking 160 (see FIGS. 1 to 2B). Thus, the information marking 160 may have a protruding shape that protrudes from the exterior upper surface of the main body 100, for example, the housing 130, and protrudes from the exterior upper surface of the label 150.

The ink may be, for example, oil-based ink using a volatile organic solvent, water-based ink having water resistance after drying and using water as a solvent, or plastisol ink, but is not limited thereto.

Thereafter, the screen 10 may be removed to only leave a portion of the ink filling the mesh openings 12 on the exterior upper surface of the main body 100 and the label 150. Then, the ink remaining on the exterior upper surface of the main body 100 and the label 150 may be dried to form the information marking 160. A portion of the ink filling the first opening 12a may be dried to be the first marking portion 160a, and a portion of the ink filling the second opening 12b may be dried to be the second marking portion 160b. The ink may be dried using heat, light, or ultraviolet light or may be naturally dried in a dark place.

Referring to FIG. 4B, the information marking 160 may be formed by an imprint method. In detail, the main body 100, where the label 150 is attached, for example, the housing 130, is prepared, and a stamp 20 having a pattern 22 is prepared. The stamp 20 may include an elastic material. The pattern 22 of the stamp 20 may be filled with ink 24, the pattern 22 filled with the ink 24 may be directed to face the exterior upper surface of the main body 100, where the label 150 is attached, and the stamp 20 may contact the exterior upper surface of the main body 100, where the label 150 is attached.

The stamp 20 may contact the exterior upper surface of the main body 100, where the label 150 is attached, in order for the pattern 22 filled with the ink 24 to cover some portions of the exterior upper surface of the main body 100, where the label 150 is not attached, and the label 150.

By applying pressure to the stamp 20, the ink 24 filling the pattern 22 of the stamp 20 may be transferred onto some portions of the exterior upper surface of the main body 100, where the label 150 is not attached, and onto the label 150. Then, the stamp 20 may be removed. Thereafter, the ink 24 transferred onto the exterior upper surface of the main body 100 and the label 150 may be dried to form the information marking 160 (see FIGS. 1 to 2B).

Referring to FIG. 4C, the main body 100, where the label 150 is attached, for example, the housing 130, is prepared, and an ink pattern 34 is formed on a surface of a blanket roll 30. In some embodiments, the surface of the blanket roll 30 may be covered by a silicone layer. Then, the blanket roll 30 rotates and contacts some portions of the exterior upper surface of the main body 100, where the label 150 is not attached, and contacts the label 150 to transfer the ink pattern 34 onto the some portions of the exterior upper surface of the main body 100, where the label 150 is not attached, and onto the label 150. The ink pattern 34 transferred onto the exterior upper surface of the main body 100 and onto the label 150 is dried to form the information marking 160 (see FIGS. 1 to 2B).

The ink pattern 34 may be formed on the surface of the blanket roll 30, for example, by a gravure roll off-set method. In detail, paste or ink may be supplied to a rotating gravure roll with grooves, wherein a doctor blade may be used to fill the grooves of the gravure roll with the supplied paste or ink or remove the remaining paste or ink. The paste or ink filling the grooves of the gravure roll may contact the blanket roll 30, contacting the gravure roll and rotating, to form the ink pattern 34 on the surface of the blanket roll 30.

The ink pattern 34 may be formed on the surface of the blanket roll 30, for example, by a plate-to-plate off-set method. In detail, a paste or ink may be supplied onto a cliché with grooves, wherein a doctor blade may be used to fill the grooves of the cliché with the supplied paste or ink or remove the remaining paste or ink. The paste or ink filling the grooves of the cliché may contact the blanket roll 30, contacting the cliché and rotating to form the ink pattern 34 on the surface of the blanket roll 30.

The ink pattern 34 may be formed on the surface of the blanket roll 30, for example, by a reverse off-set method. In detail, a paste layer or an ink layer may be formed on the surface of the rotating blanket roll 30 and then, the blanket roll 30 may contact and rotate over the cliché with grooves to transfer some portions of the paste layer or some portions of the ink layer onto an upper surface of the cliché. The grooves of the cliché may not contact the blanket roll 30, and thus the ink pattern 34 may be formed on the blanket roll 30 by the grooves of the cliché. That is, a portion of the paste layer or the ink layer, formed on the surface of the blanket roll 30, excluding a portion of the paste layer or the ink layer that is transferred onto the exterior upper surface of the cliché, may be the ink pattern 34.

Figure 5A:
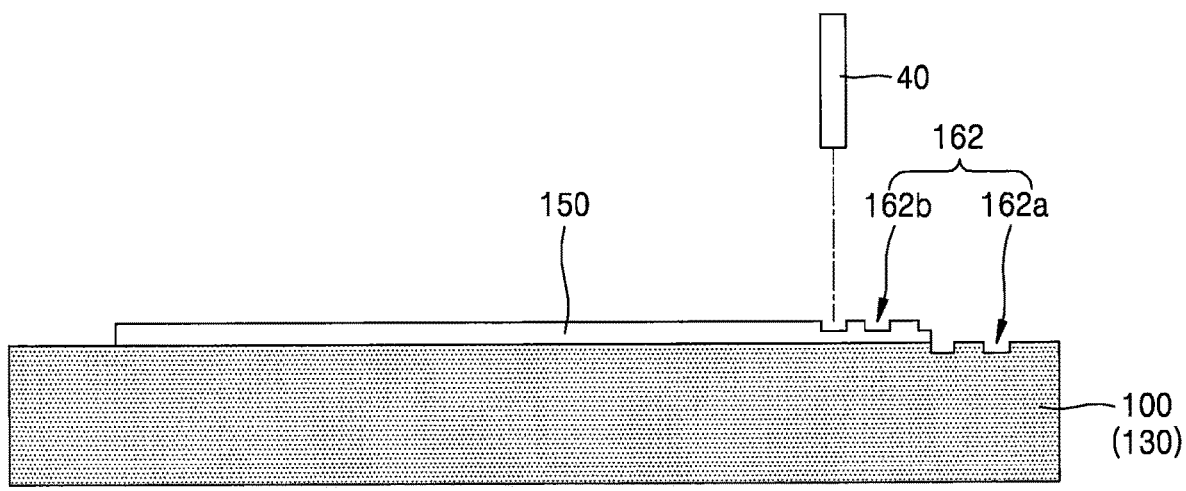
FIGS. 5A and 5B are cross-sectional views illustrating operations of methods of manufacturing a solid state drive apparatus according to some embodiments of the inventive concepts.
Figure 5B:
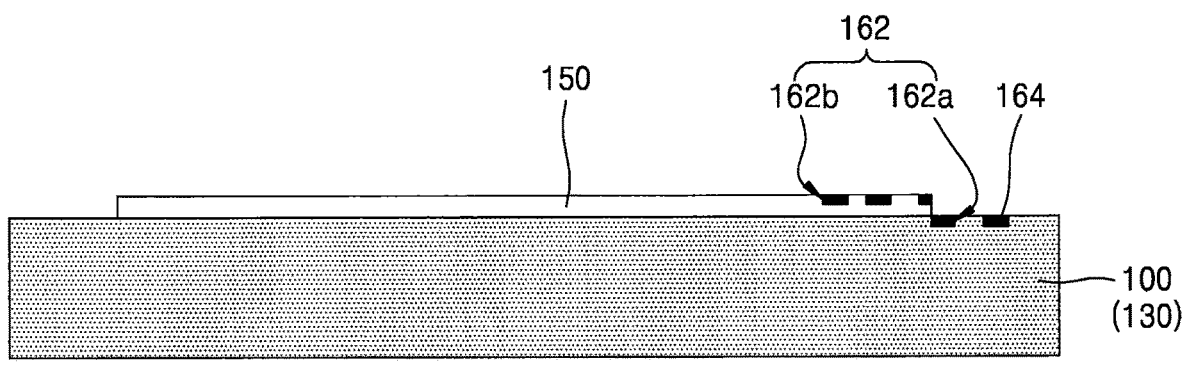

FIGS. 5A and 5B are cross-sectional views illustrating operations of methods of manufacturing a solid state drive apparatus, according to some embodiments of the inventive concepts.

Referring to FIG. 5A, an information marking 162 may be formed by a laser marking method. In detail, laser light may be irradiated onto the main body 100, where the label 150 is attached, for example, the housing 130, by using a laser 40 to form the information marking 162.

In some embodiments, the laser 40 may irradiate laser light of relatively high energy, for example an energy of about 15 W (Watts) to about 25 W (Watts). Some portions may be removed from each of the surface of the main body 100 and the surface of the label 150 so that the information marking 162 may have a groove shape extending into the surface of the main body 100 and into the label 150. In some embodiments, the information marking 162 may be the groove shape having a depth of about 3 µm to about 20 µm. The information marking 162 may include a first marking portion 162a having a groove shape by removing some portions of the surface of the main body 100 and a second marking portion 162b having a groove shape by removing some portions of the surface of the label 150. Even when the label 150 is removed from the main body 100, the first marking portion 162a may remain on the surface of the main body 100. A part of information on storage capacity of the solid state drive apparatus 1 may remain in the first marking portion 162a, and thus, when a fake label, on which false information on the storage capacity is printed, is newly attached to the solid state drive apparatus 1, it may be confirmed that a fake label is used by comparing the fake label with the first marking portion 162a.

Referring to FIG. 5B, the information marking 162 may be formed by a laser marking method. In detail, as described in FIG. 5A, laser light may be irradiated by using the laser 40 (see FIG. 5A) onto the main body 100, where the label 150 is attached, for example, the housing 130, to form the information marking 162 having a groove shape. Next, a groove portion of the groove shape of the information marking 162 may be filled with ink or paint to form an auxiliary information marking 164. In some embodiments, the auxiliary information marking 164 may have a thickness of about 3 µm to about 20 µm.

In some embodiments, the laser 40 may irradiate laser light of relatively low energy, for example an energy of about 1 W (Watts) to about 5 W (Watts). In some embodiments, the auxiliary information marking 164 may be a discolored layer in which some portions of each of the surface of the main body 100 and the surface of the label 150 are discolored.

Figure 6A:
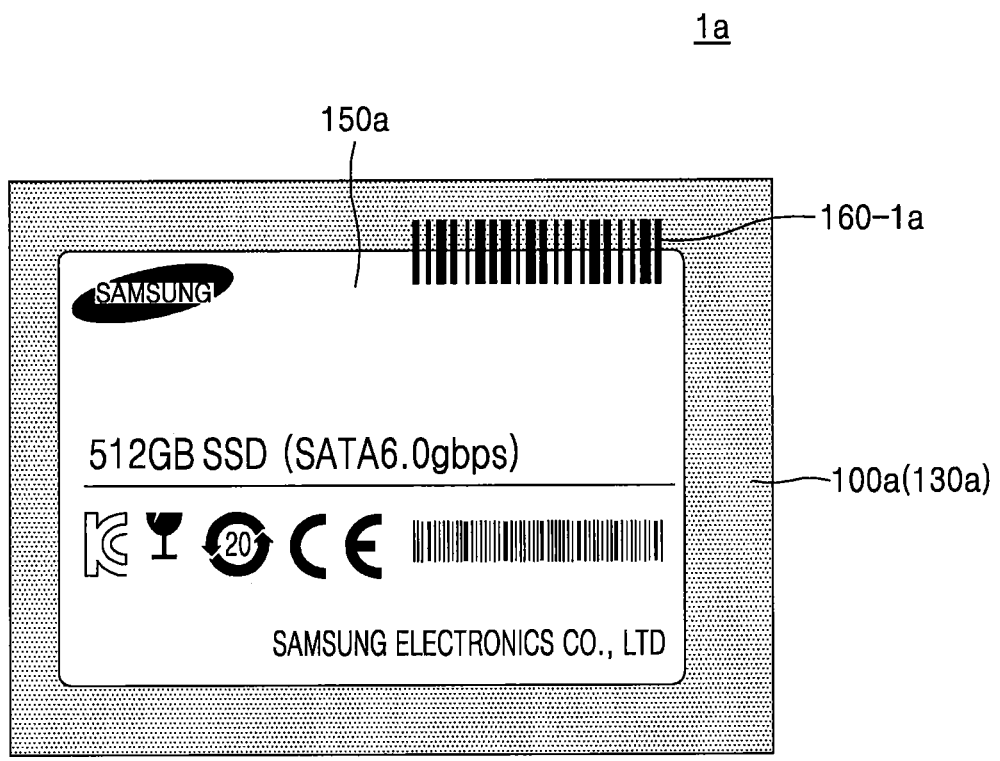
FIGS. 6A and 6B are top views illustrating a solid state drive apparatus according to some embodiments of the inventive concepts.
Figure 6B:
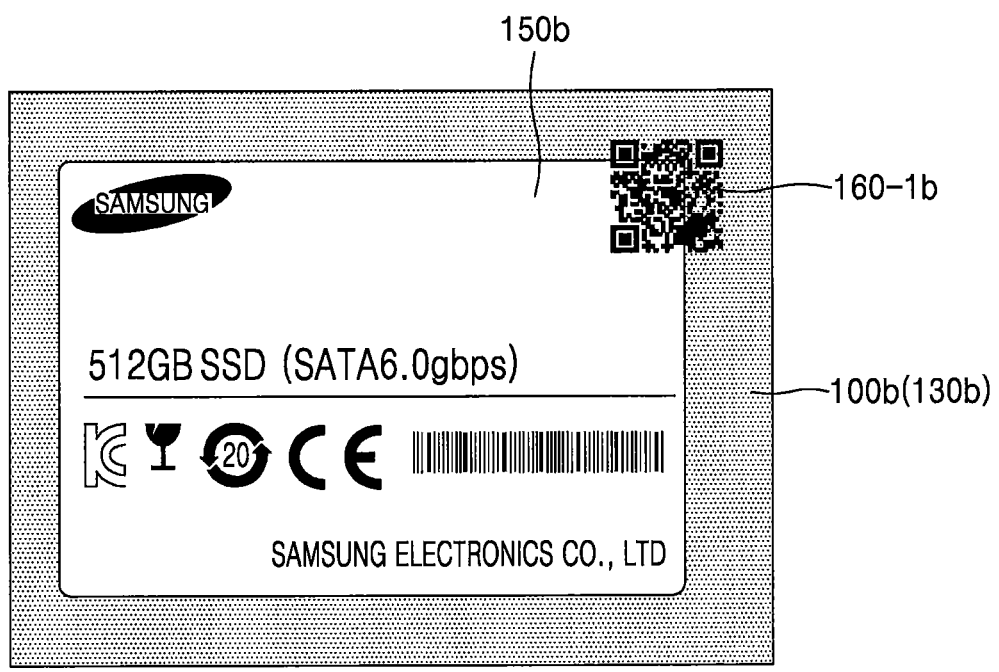

FIGS. 6A and 6B are top views illustrating a solid state drive apparatus according to some embodiments of the inventive concepts.

Referring to FIG. 6A, a solid state drive apparatus 1a may include a main body 100a, a label 150a attached onto the main body 100a, and an information marking 160-1a marked to overlap some portions of the exterior upper surface of the main body 100a, where the label 150a is not attached, and the label 150a. When the solid state drive apparatus 1a includes a housing 130a, the label 150a may be attached onto the housing 130a, and the information marking 160-1a may be marked to overlap some portions of the exterior upper surface of the housing 130a, where the label 150a is not attached, and the label 150a. The information marking 160-1a may be, for example, a barcode including information on the storage capacity of the solid state drive apparatus 1a. In some embodiments, a bar code printed on the label 150a may include different information from information of a bar code of the information marking 160-1a.

Referring to FIG. 6B, a solid state drive apparatus 1b may include a main body 100b, a label 150b attached to the main body 100b, and an information marking 160-1b marked to overlap some portions of the exterior upper surface of the main body 100b, where the label 150b is not attached, and the label 150b. When the solid state drive apparatus 1b includes a housing 130b, the label 150b may be attached onto the housing 130b, and the information marking 160-1b may be marked to overlap some portions of the exterior upper surface of the housing 130b, where the label 150b is not attached, and the label 150b. The information marking 160-1b may be a machine readable code, for example a QR code, including information on the storage capacity of the solid state drive apparatus 1b.

Figure 7A:
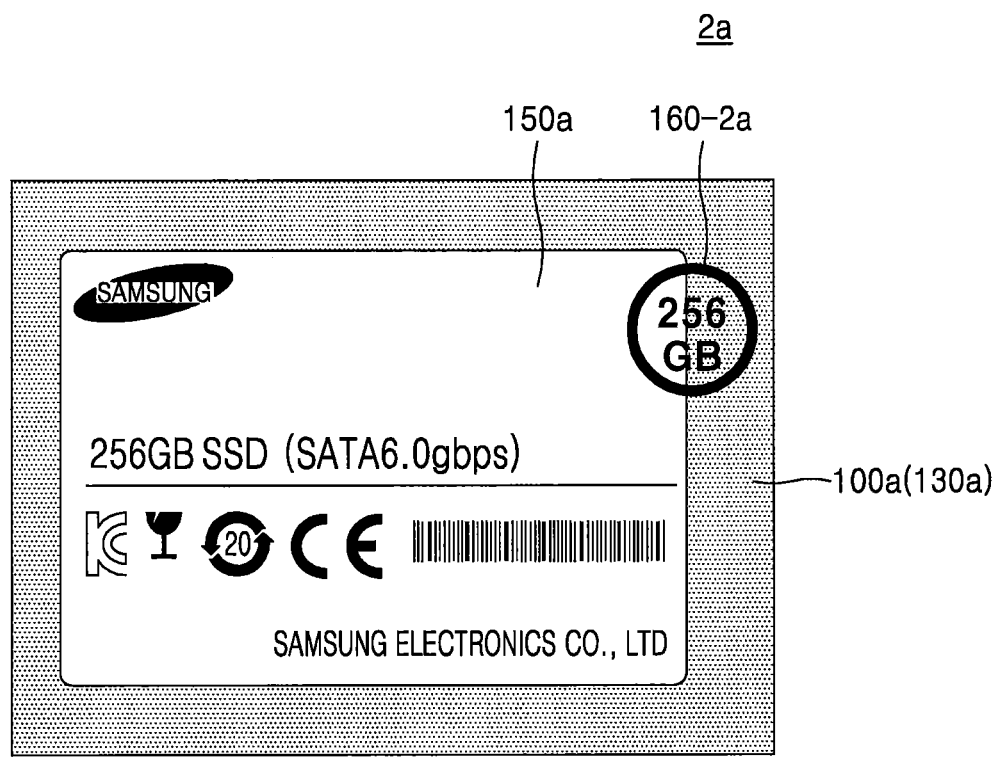
FIGS. 7A and 7B are top views illustrating a solid state drive apparatus according to some embodiments of the inventive concepts.
Figure 7B:
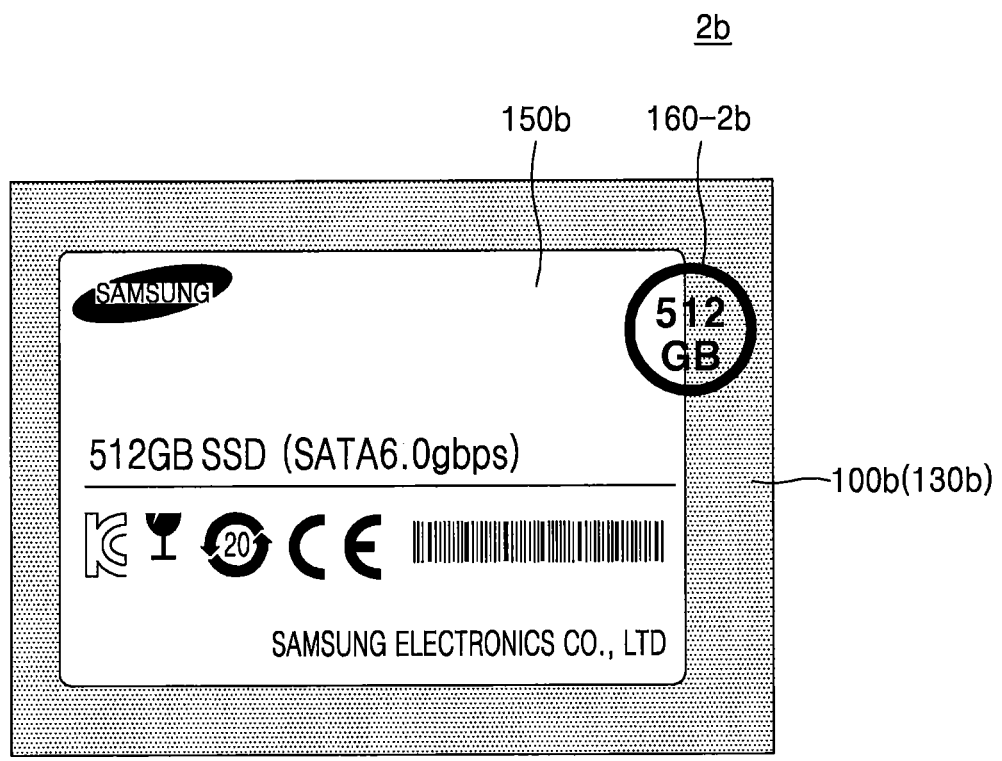

FIGS. 7A and 7B are top views illustrating a solid state drive apparatus according to some embodiments of the inventive concepts.

Referring to FIGS. 7A and 7B, first and second labels 150a and 150b, on which information on different respective storage capacities are printed, may be respectively attached to first and second solid state drive apparatuses 2a and 2b having the different respective storage capacities, and first and second information markings 160-2a and 160-2b including the respective information on the respective different storage capacities may be displayed thereon. FIG. 7A illustrates that the first solid state drive apparatus 2a has a storage capacity of 256 GB, and FIG. 7B illustrates that the second solid state drive apparatus 2b has a storage capacity of 512 GB. However, the inventive concepts are not limited thereto.

The first solid state drive apparatus 2a may include the first label 150a attached to an exterior upper surface of a main body 100a, for example, a housing 130a, and the first information marking 160-2a marked over the surface of the main body 100a, where the first label 150a is not attached, and the first label 150a. The second solid state drive apparatus 2b may include the second label 150b attached to an exterior upper surface of a main body 100b, for example, a housing 130b, and the second information marking 160-2b marked over the surface of the main body 100b, where the second label 150b is not attached, and the second label 150b.

The first information marking 160-2a and the second information marking 160-2b may be displayed at the same position respectively corresponding to the main body 100a of the first solid state drive apparatus 2a and the main body 100b of the second solid state drive apparatus 2b.

When the first label 150a is removed and a fake label that is similar to the second label 150b is attached to the first solid state drive apparatus 2a, it may be confirmed by a portion of the first information marking 160-2a that the attached label is fake. In other words, the first information marking 160-2a on the main body 100a of the first solid state drive apparatus 2a will not match the information marking 160-2b on the fake label.

Figure 8A:
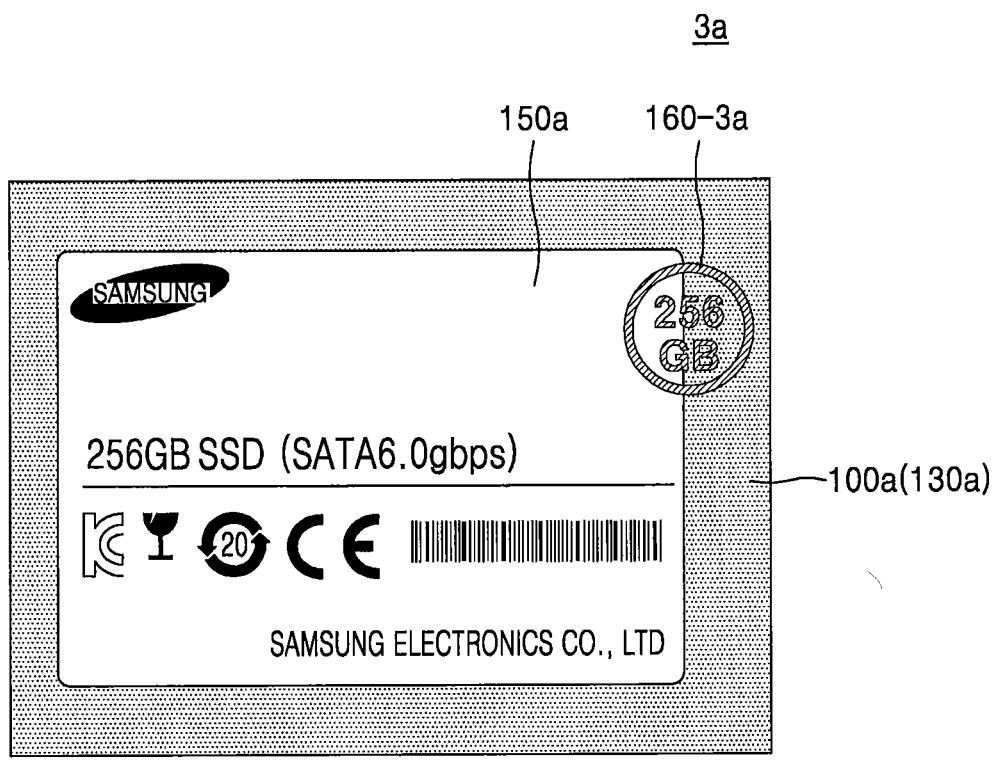
FIGS. 8A and 8B are top views illustrating a solid state drive apparatus according to some embodiments of the inventive concepts.
Figure 8B:
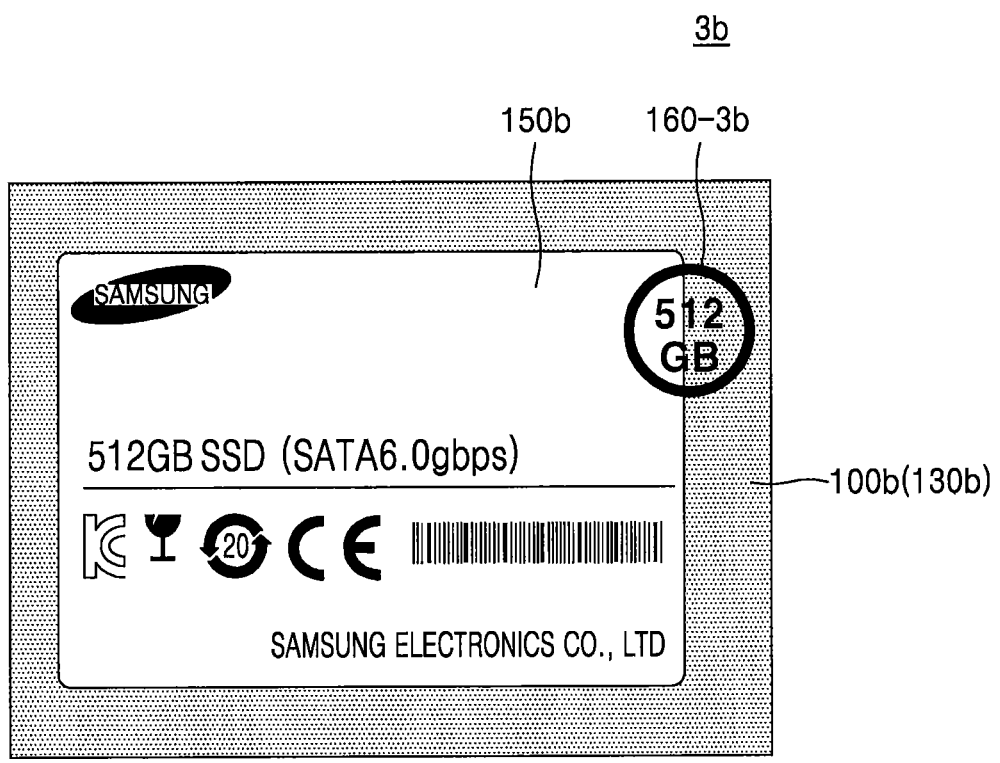

FIGS. 8A and 8B are top views illustrating a solid state drive apparatus according to some embodiments of the inventive concepts.

Referring to FIGS. 8A and 8B, first and second labels 150a and 150b, on which information on different respective storage capacities are printed, may be respectively attached to first and second solid state drive apparatuses 3a and 3b having the different respective storage capacities, and first and second information markings 160-3a and 160-3b including the respective information on the respective different storage capacities may be displayed thereon The first solid state drive apparatus 3a may include the first label 150a attached to an exterior upper surface of a main body 100a, for example, a housing 130a, and the first information marking 160-3*a* displayed over the surface of the main body 100*a*, where the first label 150*a* is not attached, and the first label 150*a*. The second solid state drive apparatus 3*b* may include the second label 150*b* attached to an exterior upper surface of a main body 100*b*, for example, a housing 130*b*, and the second information marking 160-3*b* displayed over the surface of the main body 100*a*, where the second label 150*b* is not attached, and the second label 150*b*.

The first information marking 160-3*a* and the second information marking 160-3*b* may be displayed at the same position respectively corresponding to the main body 100*a* of the first solid state drive apparatus 3*a* and the main body 100*b* of the second solid state drive apparatus 3*b*.

The first information marking 160-3*a* and the second information marking 160-3*b* may have different characteristics. For example, the first information marking 160-3*a* and the second information marking 160-3*b* may have different colors or may have different patterns.

Even when solid state drive apparatuses have different storage capacities, the solid state drive apparatuses may conform to the standard or may have a body of a same shape or a similar shape for compatibility. Here, when the color or pattern of an information marking is determined and displayed so as to correspond to a storage capacity of a solid state drive apparatus, the storage capacity of the solid state drive apparatus may be easily distinguished, and the forgery of the storage capacity may also be easily detected. That is, when the storage capacities of solid state drive apparatuses are the same, the color or pattern of an information marking may be displayed in the same color or pattern, and when the storage capacities of solid state drive apparatuses are different, the color or pattern of an information marking may be displayed in different colors or patterns.

In some embodiments, even when the storage capacities of solid state drive apparatuses are the same, the color or pattern of information markings may be displayed in a different color or pattern. In this case, the forgery may also be detected for the serial number (SN), the part number (P/N), or the like.

Figure 9A:
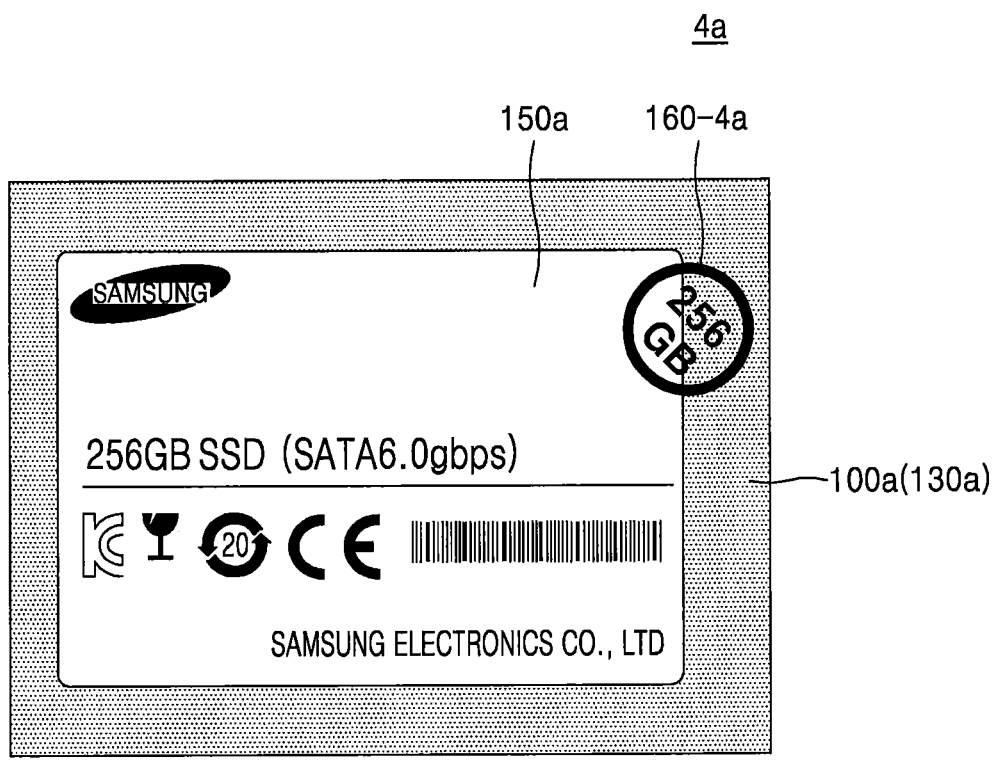
FIGS. 9A and 9B are top views illustrating a solid state drive apparatus according to some embodiments of the inventive concepts.
Figure 9B:
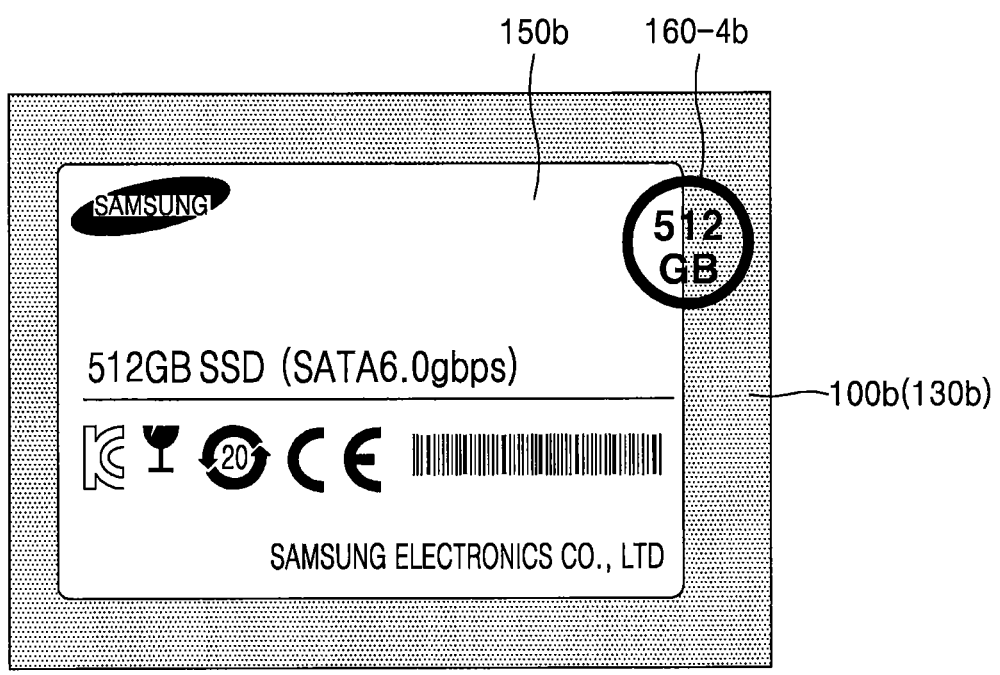

FIGS. 9A and 9B are top views illustrating a solid state drive apparatus according to some embodiments of the inventive concepts.

Referring to FIGS. 9A and 9B, first and second labels 150*a* and 150*b*, on which information on different respective storage capacities are printed, may be respectively attached to first and second solid state drive apparatuses 4*a* and 4*b* having the different respective storage capacities, and first and second information markings 160-4*a* and 160-4*b* including the respective information on the different respective storage capacities may be displayed thereon.

The first solid state drive apparatus 4*a* may include the first label 150*a* attached to an exterior upper surface of a main body 100*a*, for example, a housing 130*a*, and the first information marking 160-4*a* displayed over the surface of the main body 100*a*, where the first label 150*a* is not attached, and the first label 150*a*. The second solid state drive apparatus 4*b* may include the second label 150*b* attached to an exterior upper surface of a main body 100*b*, for example, a housing 130*b*, and the second information marking 160-4*b* displayed over the surface of the main body 100*b*, where the second label 150*b* is not attached, and the second label 150*b*.

The first information marking 160-4*a* and the second information marking 160-4*b* may be displayed at the same position respectively corresponding to the main body 100*a* of the first solid state drive apparatus 4*a* and the main body 100*b* of the second solid state drive apparatus 4*b*.

The first information marking 160-4*a* and the second information marking 160-4*b* may have different characteristics. For example, the first information marking 160-4*a* and the second information marking 160-4*b* may have different rotation angles. Here, the rotation angle refers to an angle between an alignment direction of information on the storage capacity printed on the first and the second labels 150*a* and 150*b* and an alignment direction of information on the storage capacity included in the first and the second information marking 160-4*a* and 160-4*b*. For example, a rotation angle between the alignment direction of the information on the storage capacity printed on the first label 150*a* and the alignment direction of the information on the storage capacity included in the first information marking 160-4*a* may be 45 degrees, and a rotation angle between the alignment direction of the information on the storage capacity printed on the second label 150*b* and the alignment direction of the information on the storage capacity included in the second information marking 160-4*b* may be 0 degrees.

In other words, regarding the rotation angle of the information marking, when the storage capacity of the solid state drive apparatus is the same, the rotation angle may be the same, and when the storage capacity thereof is different, the rotation angle may be different. Accordingly, the solid state drive apparatus may have an information marking having a rotation angle corresponding to a storage capacity.

In some embodiments, even when the storage capacities of solid state drive apparatuses are the same, the rotation angle of information markings may be different from each other. In this case, the forgery may also be detected for the serial number (S/N), the part number (P/N), or the like.

Figure 10A:
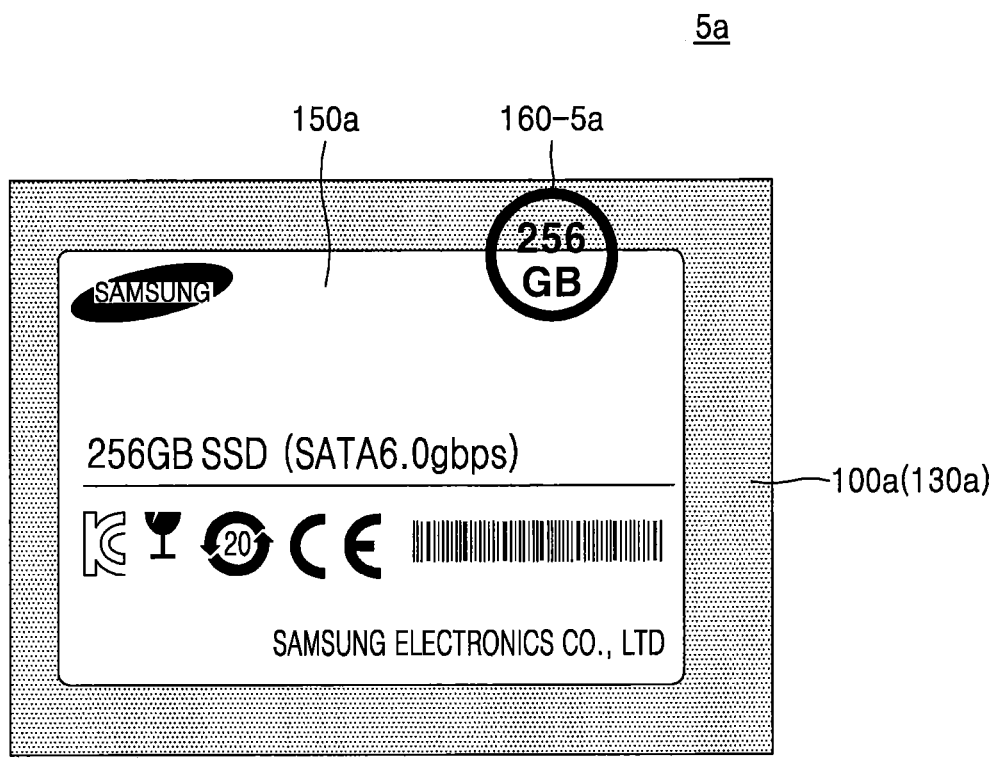
FIGS. 10A and 10B are top views illustrating a solid state drive apparatus according to some embodiments of the inventive concepts.
Figure 10B:
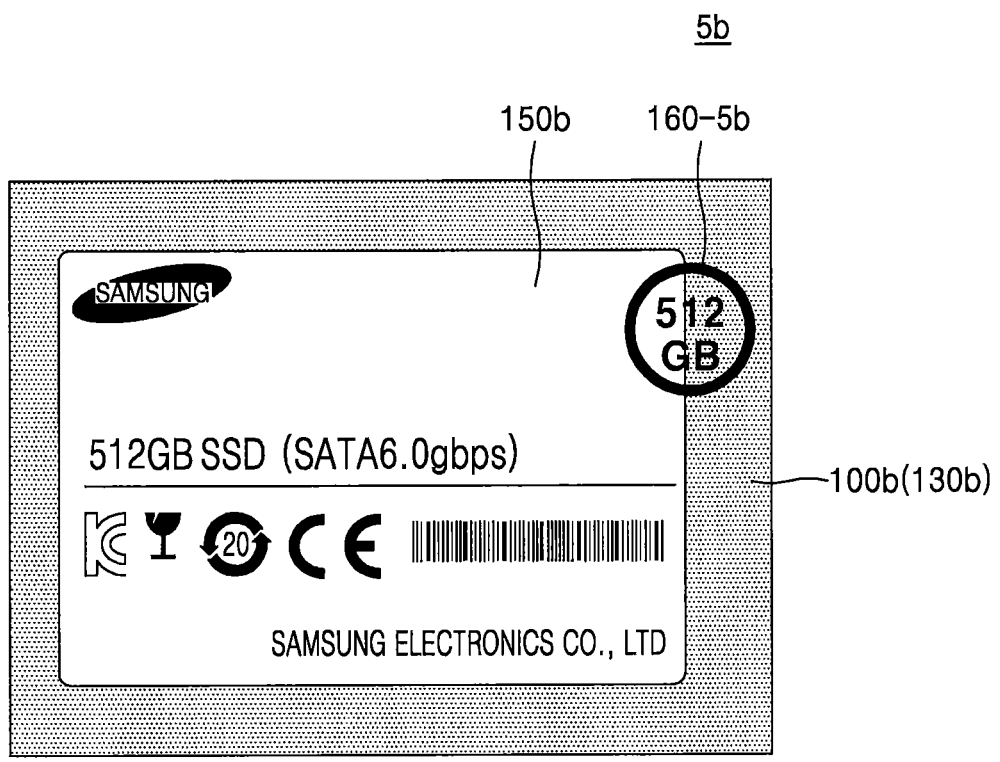

FIGS. 10A and 10B are top views illustrating a solid state drive apparatus according to some embodiments of the inventive concepts.

Referring to FIGS. 10A and 10B, first and second labels 150*a* and 150*b*, on which information on different respective storage capacities are printed, may be respectively attached to first and second solid state drive apparatuses 5*a* and 5*b* having the different respective storage capacities, and first and second information markings 160-5*a* and 160-5*b* including the respective information on the different respective storage capacities may be displayed thereon The first solid state drive apparatus 5*a* may include the first label 150*a* attached to an exterior upper surface of a main body 100*a*, for example, a housing 130*a*, and the first information marking 160-5*a* displayed over the surface of the main body 100, where the first label 150*a* is not attached, and the first label 150*a*. The second solid state drive apparatus 5*b* may include the second label 150*b* attached to an exterior upper surface of a main body 100*b*, for example, a housing 130*b*, and the second information marking 160-5*b* displayed over the surface of the main body 100 where the second label 150*b* is not attached, and the second label 150*b*.

The first information marking 160-5*a* and the second information marking 160-5*b* may be displayed at different positions respectively corresponding to the main body 100*a* of the first solid state drive apparatus 5*a* and the main body 100*b* of the second solid state drive apparatus 5*b*.

In other words, when storage capacities of solid state drive apparatuses are the same, information markings may be displayed at the same positions corresponding to each other, and when storage capacities are different, information markings may be displayed at different positions. Accordingly, the solid state drive apparatus may have an information marking at a display position corresponding to a storage capacity.

Figure 11A:
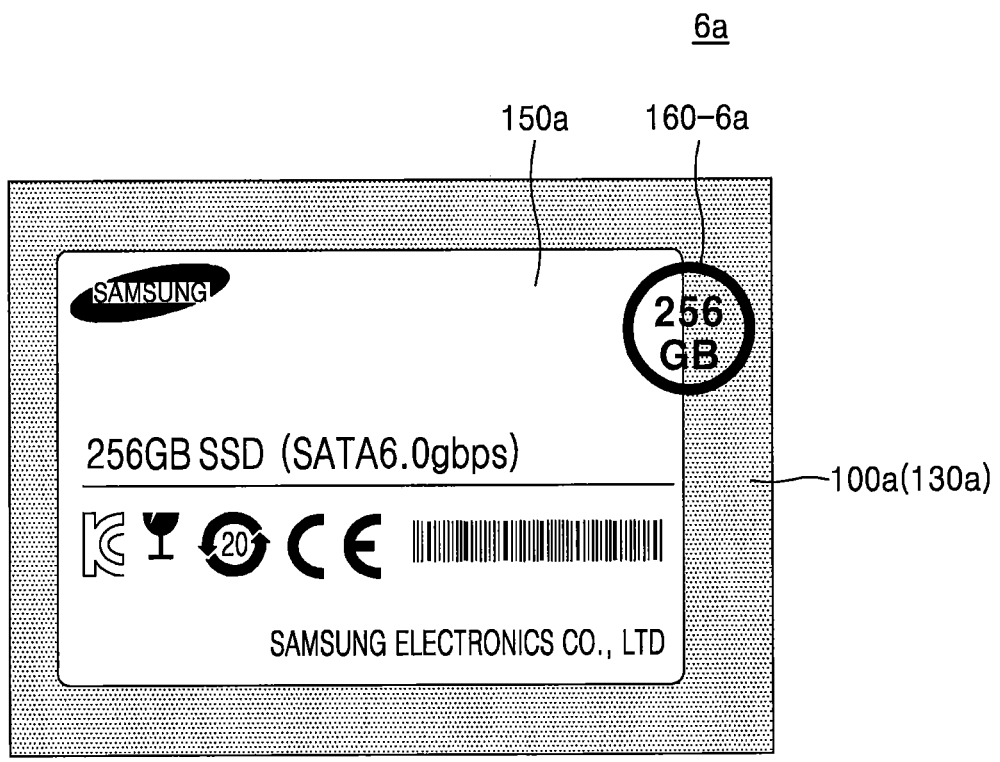
FIGS. 11A and 11B are top views illustrating a solid state drive apparatus according to some embodiments of the inventive concepts.
Figure 11B:
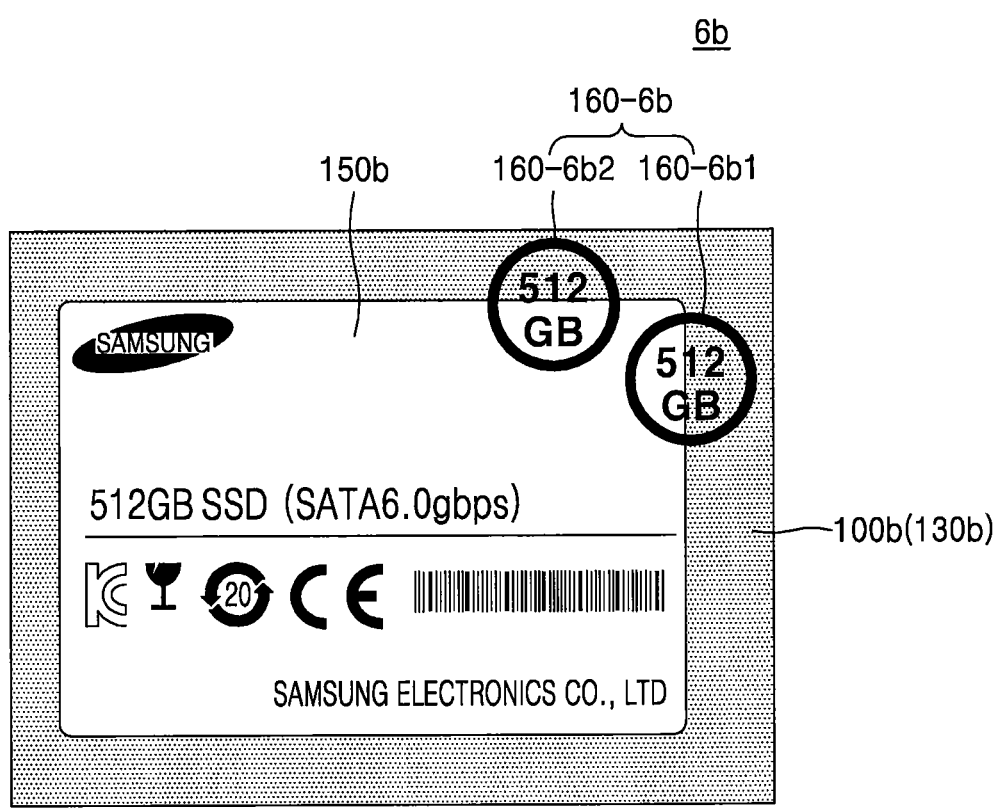

FIGS. 11A and 11B are top views illustrating a solid state drive apparatus according to some embodiments of the inventive concepts.

Referring to FIGS. 11A and 11B, first and second labels 150a and 150b, on which information on different respective storage capacities are printed, may be respectively attached to first and second solid state drive apparatuses 6a and 6b having the different respective storage capacities, and first and second information markings 160-6a and 160-6b including the respective information on the different respective storage capacities may be displayed thereon.

The first solid state drive apparatus 6a may include the first label 150a attached to an exterior upper surface of a main body 100a, for example, a housing 130a, and the first information marking 160-6a displayed over the surface of the main body 100a, where the first label 150a is not attached, and the first label 150a. The second solid state drive apparatus 6b may include the second label 150b attached to an exterior upper surface of a main body 100b, for example, a housing 130b, and the second information marking 160-6b displayed over the surface of the main body 100b, where the second label 150b is not attached, and the second label 150b.

A quantity of the first information markings 160-6a may be different from a quantity of the second information markings 160-6b. In detail, the number of first information markings 160-6a displayed over the surface of the main body 100a, where the first label 150a is not attached, and the first label 150a, of the first solid state drive apparatus 6a, may be different from the number of second information markings 160-6b displayed over the surface of the main body 100b, where the second label 150b is not attached, and the second label 150b, of the second solid state drive apparatus 6b.

FIGS. 11A and 11B illustrate, though embodiments are not limited thereto, that the number of first information markings 160-6a is one, and the number of second information markings 160-6b is two, which are second information markings 160-6b1 and 160-6b2.

In other words, when storage capacities of solid state drive apparatuses are the same, the number of information markings may be the same, and when storage capacities are different, the number of information markings may be different. Accordingly, the solid state drive apparatus may have information markings in the number corresponding to the storage capacity.

Figure 12A:
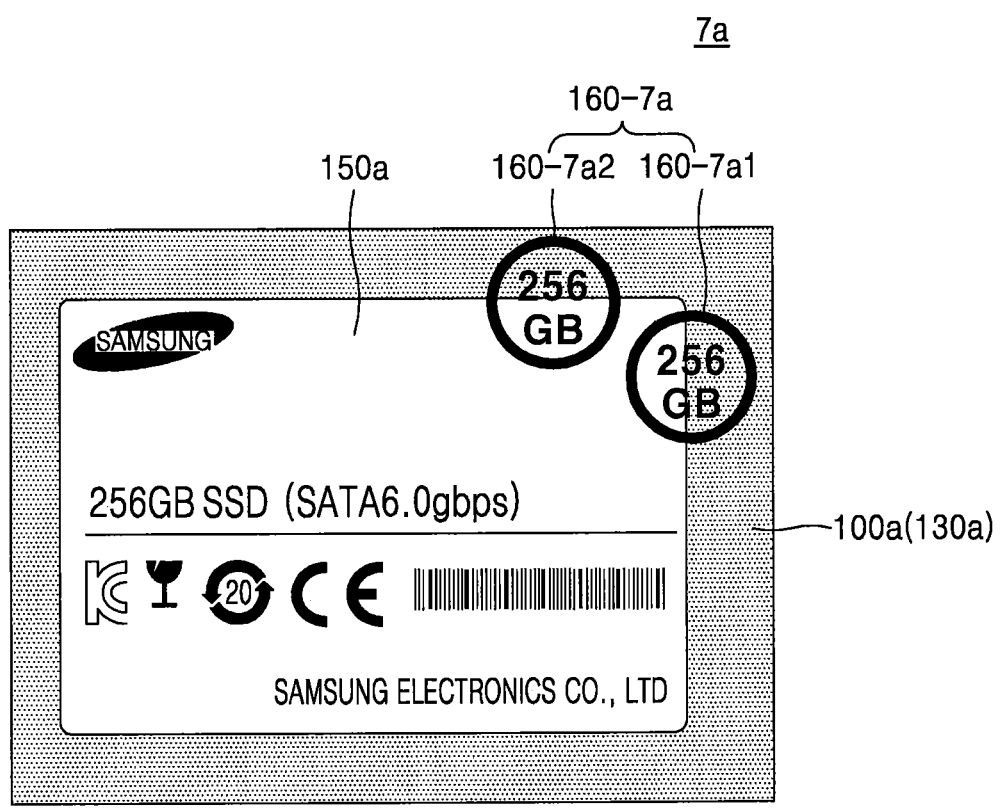
FIGS. 12A and 12B are top views illustrating a solid state drive apparatus according to some embodiments of the inventive concepts.
Figure 12B:
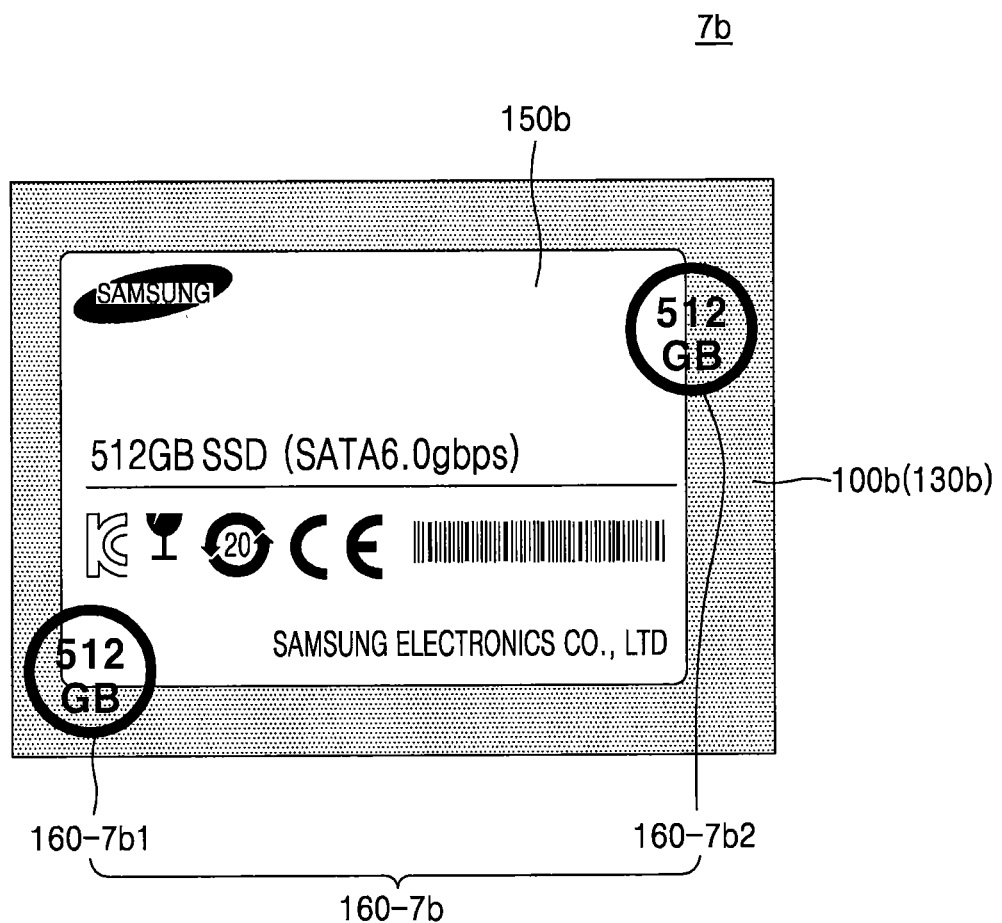

FIGS. 12A and 12B are top views illustrating a solid state drive apparatus according to some embodiments of the inventive concepts.

Referring to FIGS. 12A and 12B, first and second labels 150a and 150b, on which information on different respective storage capacities are printed, are respectively attached to first and second solid state drive apparatuses 7a and 7b having the different respective storage capacities, and first and second information markings 160-7a and 160-7b including the respective information on the different respective storage capacities are displayed thereon.

The first solid state drive apparatus 7a may include the first label 150a attached to an exterior upper surface of a main body 100a, for example, a housing 130a, and the first information marking 160-7a displayed over the surface of the main body 100a, where the first label 150a is not attached, and the first label 150a. The second solid state drive apparatus 7b may include the second label 150b attached to an exterior upper surface of a main body 100b, for example, a housing 130b, and the second information marking 160-7b displayed over the surface of the main body 100b, where the second label 150b is not attached, and the second label 150b.

The first information marking 160-7a and the second information marking 160-7b may each include a plurality of markings displayed at different positions. In detail, a plurality of first information markings 160-7a1 and 160-7a2 may be displayed over the surface of the main body 100a, where the first label 150a is not attached, and the first label 150a, of the first solid state drive apparatus 7a, and a plurality of second information markings 160-7b1 and 160-7b2 may be displayed over the surface of the main body 100b, where the second label 150b is not attached, and the second label 150b, of the second solid state drive apparatus 7b. In some embodiments, the first information marking 160-7a and the second information marking 160-7b may include a plurality of markings in the same number.

FIGS. 12A and 12B illustrate, though embodiments are not limited thereto, that the number of first information markings 160-7a is two, for example, first information markings 160-7a1 and 160-7a2, and the number of second information markings 160-7b is two, for example, second information markings 160-7b1 and 160-7b2.

At least one of the first information markings 160-7a1 and 160-7a2 and at least one of the second information markings 160-7b1 and 160-7b2 may be respectively displayed at different positions from each other in the main body 100a of the first solid state drive apparatus 7a and the main body 100b of the second solid state drive apparatus 7b. In some embodiments, at least one of the first information markings 160-7a1 and 160-7a2 and at least one of second information markings 160-7b1 and 160-7b2 may be respectively displayed at the same corresponding positions in the main body 100a of the first solid state drive apparatus 7a and in the main body 100b of the second solid state drive apparatus 7b, but embodiments of the inventive concepts are not limited thereto.

When storage capacities of solid state drive apparatuses are the same, each position combination in which a plurality of information markings may be displayed is a combination of the same positions, and when storage capacities of solid state drive apparatuses are different, each position combination in which a plurality of information markings are displayed may be a combination of different positions. That is, a plurality of information markings of a solid state drive apparatus may have a pattern of a position combination corresponding to a storage capacity.

Accordingly, when storage capacities of solid state drive apparatuses vary, positions in which a plurality of information markings are respectively displayed may be combined so that a storage capacity of a solid state drive apparatus is easily distinguished.

Figure 13:
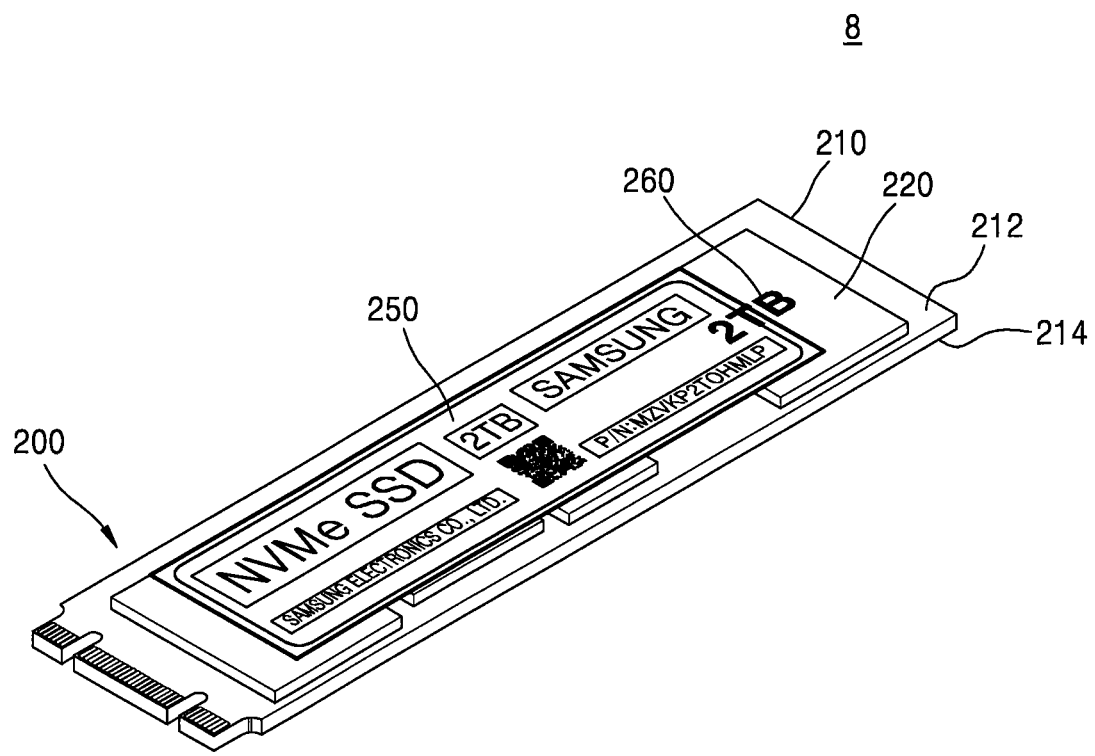
FIG. 13 is a top view illustrating a solid state drive apparatus according to some embodiments of the inventive concepts.

FIG. 13 is a top view illustrating a solid state drive apparatus according to some embodiments of the inventive concepts.

Referring to FIG. 13, a solid state drive apparatus 8 may include a substrate 210 on which one or more semiconductor devices 220 are mounted.

The substrate 210 may be, for example, a printed circuit board or a flexible printed circuit board, having a first surface 212 and a second surface 214 that are opposite to each other. A connector may be on one end of the substrate 210. The connector may be a connector configured to support, for example, an M2 interface, an mSATA interface, and/or an 2.5" interface.

The solid state drive apparatus 8 may be, for example, a single in-lined memory module (SIMM) in which the semiconductor devices 220 are mounted only on the first surface 212 of the substrate 210. In some embodiments, the solid state drive apparatus 8 may be a dual in-lined memory module (DIMM) in which semiconductor devices 220 are mounted on both the first surface 212 and the second surface 214 of the substrate 210.

A main body 200 of the solid state drive apparatus 8 may include the substrate 210 on which the semiconductor devices 220 are mounted. A label 250 may be attached to an upper surface of the main body 200. The label 250 may be, for example, a sticker with an adhesive. Information on a product, that is, the solid state drive apparatus 8, may be printed on the label 250. The label 250 may be attached to a surface of ones of the semiconductor devices 220. An information marking 260 may be on a portion of the exterior upper surface of the main body 200 of the solid state drive apparatus 8 where the label 250 is not attached and on the label 250. The information marking 260 may be on the label 250 and on a portion of an upper surface of at least one semiconductor device 220 where the label 250 is not attached.

Figure 14:
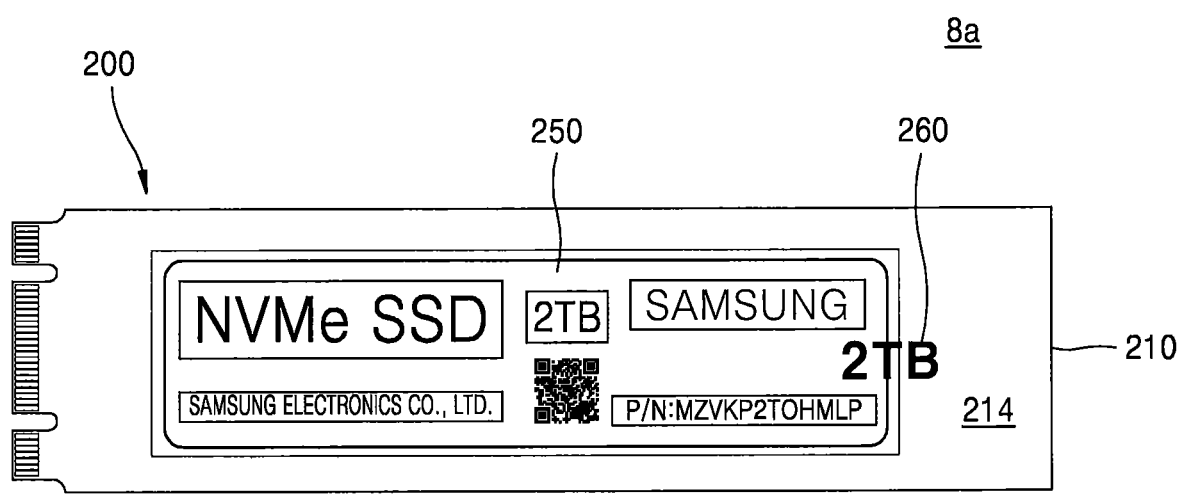
FIG. 14 is a top view illustrating a solid state drive apparatus according to some embodiments of the inventive concepts.

FIG. 14 is a top view illustrating a solid state drive apparatus according to some embodiments of the inventive concepts.

Referring to FIG. 14, a solid state drive apparatus 8a may include a substrate 210 on which one or more semiconductor devices 220 (see FIG. 13) are mounted.

The substrate 210 may be a printed circuit board or a flexible printed circuit board having a first surface 212 and a second surface 214 that are opposite to each other. The solid state drive apparatus 8 may be a single in-lined memory module (SIMM) in which the semiconductor devices 220 (see FIG. 13) are mounted only on the first surface 212 of the substrate 210.

A main body 200 of the solid state drive apparatus 8a may include the substrate 210 on which the semiconductor devices 220 (see FIG. 13) are mounted. A label 250 may be attached onto one surface of the main body 200. The label 250 may be, for example, a sticker with an adhesive. The label 250 may be attached to an upper surface of the second surface 214 of the substrate 210 where the semiconductor devices 220 (see FIG. 13) are not attached. An information marking 260 may be on a portion of one surface of the main body 200 of the solid state drive apparatus 8a where the label 250 is not attached and on the label 250. The information marking 260 may be on the label 250 and on a portion of the second surface 214 of the substrate 210 where the label 250 is not attached.

Figure 15:
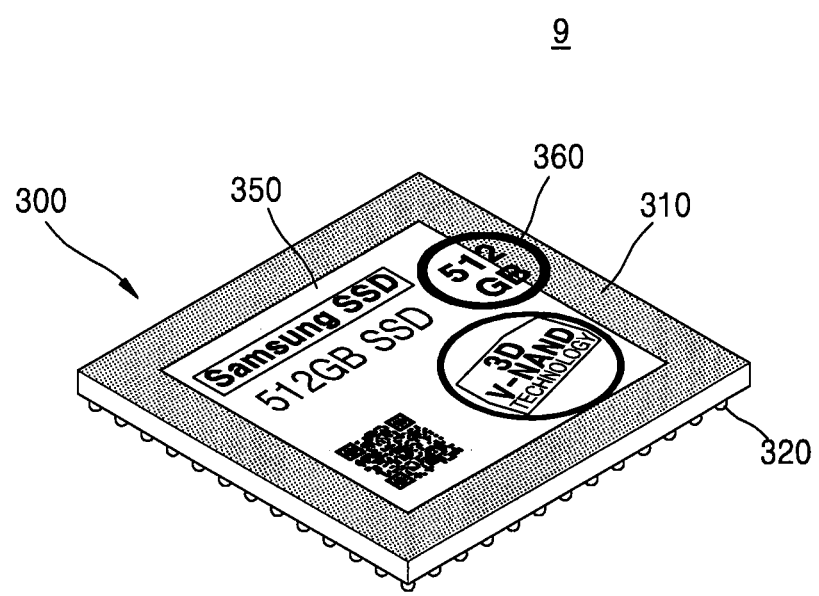
FIG. 15 is a top view illustrating a solid state drive apparatus according to some embodiments of the inventive concepts.

FIG. 15 is a top view illustrating a solid state drive apparatus according to some embodiments of the inventive concepts.

Referring to FIG. 15, a solid state drive apparatus 9 may include a semiconductor device 310 to which an external terminal 320 is attached. A main body 300 of the solid state drive apparatus 9 may be a semiconductor device 310 consisting, in some embodiments, of a single semiconductor package to which the external terminal 320 is attached on a lower surface thereof. The external terminal 320 may be, for example, a solder ball or a bump.

A label 350 may be attached to an upper surface of the main body 300 of the solid state drive apparatus 9, for example, an upper surface of the semiconductor device 310. The label 350 may be, for example, a sticker with an adhesive. Information on a product, that is, the solid state drive apparatus 9, may be printed on the label 350. An information marking 360 may be displayed over an upper surface of the main body 300 of the solid state drive apparatus 9 where the label 350 is not attached, for example, a portion of the upper surface of the semiconductor device 310, and the label 350. The information marking 360 may be displayed over the label 350, and a portion of the upper surface of the semiconductor device 310 where the label 350 is not attached.

Figure 16:
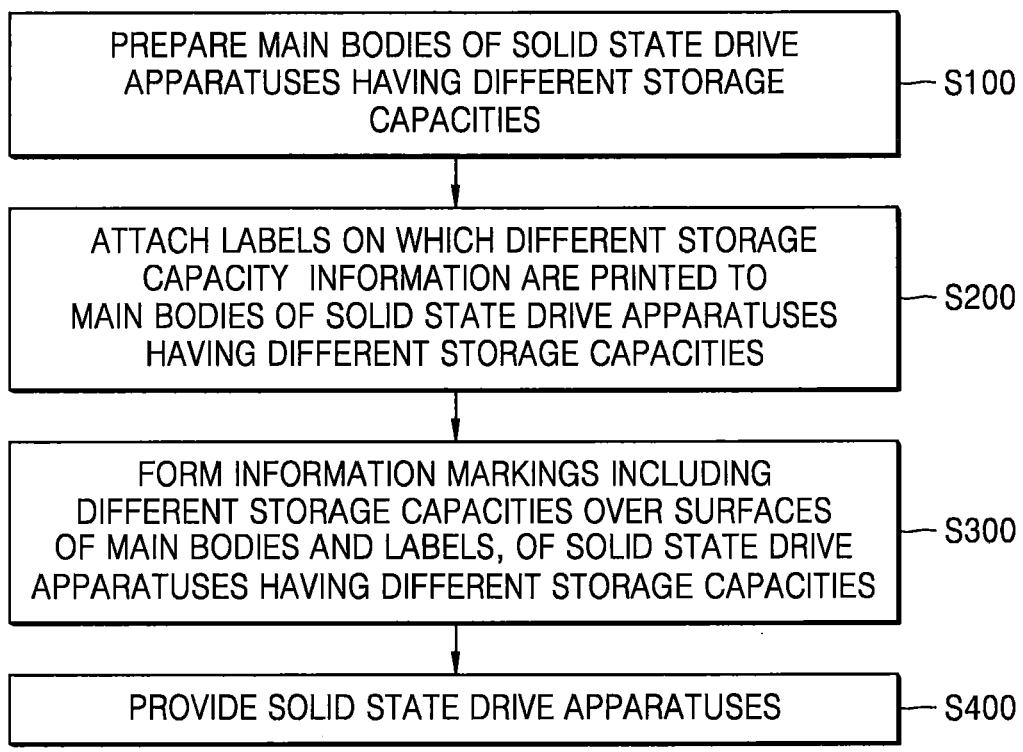
FIG. 16 is a flowchart illustrating operations of methods of manufacturing a solid state drive apparatus according to some embodiments of the inventive concepts.

FIG. 16 is a flow chart illustrating operations of methods of manufacturing a solid state drive apparatus, according to some embodiments of the inventive concepts.

Referring to FIG. 16, main bodies of solid state drive apparatuses having different storage capacities may be prepared (S100). For example, in FIGS. 7A to 12B, main bodies 100a of the first solid state drive apparatuses 2a, 3a, 4a, 5a, 6a, and 7a and main bodies 100b of the second solid state drive apparatuses 2b, 3b, 4b, 5b, 6b, and 7b may have different respective storage capacities from each other.

A label on which respective information on the different respective storage capacity is printed may be attached to surface of each of the main bodies of the solid state drive apparatuses having the different respective storage capacities (S200). For example, in FIGS. 7A to 12B, first labels 150a attached to surfaces of the main bodies 100a of the first solid state drive apparatuses 2a, 3a, 4a, 5a, 6a, and 7a and second labels 150b attached to surfaces of the main bodies 100b of the second solid state drive apparatuses 2b, 3b, 4b, 5b, 6b, and 7b may have information on the different respective storage capacities thereon.

Next, an information marking including information on the different respective storage capacity may be formed on a portion of the main body where the label is not attached and on the label, of the solid state drive apparatuses having the different respective storage capacities (S300). For example, the first information markings 160-2a, 160-3a, 160-4a, 160-5a, 160-6a, and 160-7a on the surfaces of the main bodies 100a of the first solid state drive apparatuses 2a, 3a, 4a, 5a, 6a, and 7a, and on the first label 150a and the second information markings 160-2b, 160-3b, 160-4b, 160-5b, 160-6b, and 160-7b on surfaces of the main bodies 100b of the second solid state drive apparatuses 2b, 3b, 4b, 5b, 6b, and 7b, and on the second label 150b may include information on the different respective storage capacities. The first information markings 160-2a, 160-3a, 160-4a, 160-5a, 160-6a, and 160-7a and the second information markings 160-2b, 160-3b, 160-4b, 160-5b, 160-6b, and 160-7b may include, for example, at least one of numbers, letters, numbers and units, bar codes, and QR codes that contain information on storage capacity.

Then, the solid state drive apparatuses with the labels and the information markings may be provided (S400). Therefore, if a fake label, on which false information on storage capacity is printed and attached to a solid state drive apparatus, it may be confirmed that a fake label is used based on a portion of the information marking remained on the surface of the main body of the solid state drive apparatus.

Figure 17:
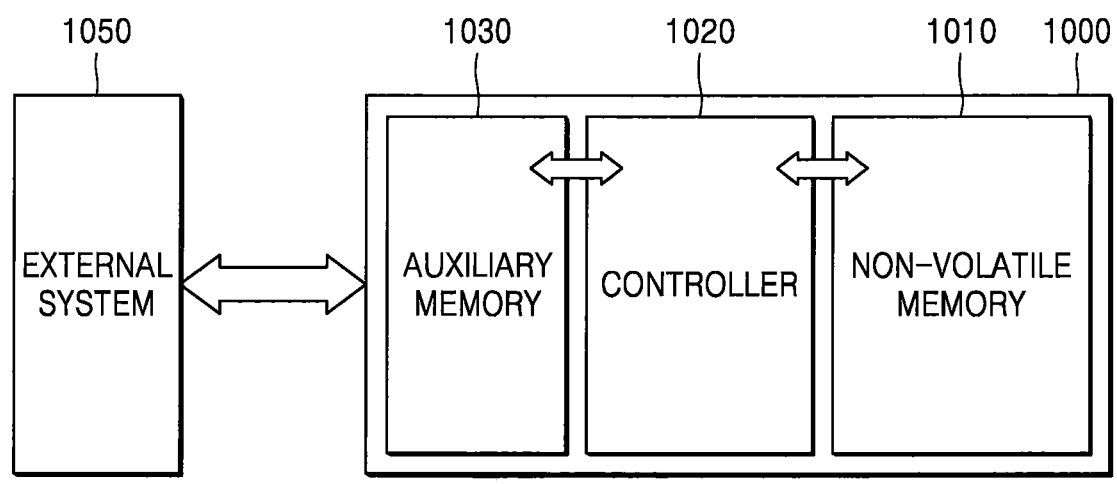
FIG. 17 is a schematic diagram illustrating a relationship between a solid state drive apparatus and an external system, according to some embodiments of the inventive concepts.

FIG. 17 is a schematic diagram illustrating a relationship between a solid state drive apparatus and an external system according to embodiments of the inventive concepts.

Referring to FIG. 17, data input from an external system 1050 may be stored in a solid state drive apparatus 1000. The solid state drive apparatus 1000 may include a non-volatile memory 1010, a controller 1020, and an auxiliary memory 1030. The solid state drive apparatus 1000 may be any one of solid state drive apparatuses 1, 1a, 1b, 2a, 2b, 3a, 3b, 4a, 4b, 5a, 5b, 6a, 6b, 7a, and 7b described with reference to FIGS. 1 to 16.

Data input from the external system 1050 may be stored in the non-volatile memory 1010 via the auxiliary memory 1030 and the controller 1020. Also, the controller 1020 may read data from the non-volatile memory 1010 via the auxiliary memory 1030 to transfer the data to the external system 1050.

Each of the non-volatile memory 1010, the controller 1020 and the auxiliary memory 1030 may be the semiconductor devices 120, 220, and 310 or a part of the semiconductor devices 120, 220, and 310 included in the solid state drive apparatuses 1, 1a, 1b, 2a, 2b, 3a, 3b, 4a, 4b, 5a, 5b, 6a, 6b, 7a, and 7b described with reference to FIGS. 1 to 16.

As described above, in a solid state drive apparatus according to embodiments of the inventive concepts, even when a label attached to a main body is removed, a portion of an information marking including information on storage capacity is remained, and thus, it may be confirmed whether a fake label is used when the fake label, on which false information on storage capacity is printed, is attached to the main body.

The terminology used herein is for the purpose of describing particular embodiments only and is not intended to be limiting of example embodiments. It will be understood that when an element is referred to as being "on" or "connected to" or "adjacent" another element (e.g., a layer or surface), it can be directly on or connected to or adjacent the other element, or intervening elements may also be present. In contrast, when an element is referred to as being "directly on" or "directly connected to" or "immediately adjacent" another element, there are no intervening elements present. It will be understood that when an element is referred to as being "attached to" another element (e.g., a layer or surface), it can be directly attached to the other element, or intervening elements, such as, for example, an adhesive layer, may also be present.

It will also be understood that, although the terms first, second, etc. may be used herein to describe various elements, these elements should not be limited by these terms. These terms are only used to distinguish one element from another element. Thus, a first element discussed below could be termed a second element without departing from the scope of the present inventive concepts.

It will be understood that spatially relative terms, such as "beneath," "below," "lower," "above," "upper" and the like, are intended to encompass different orientations of the device in use or operation in addition to the orientation depicted in the figures. For example, if the device in the figures is turned over, elements described as "below" or "beneath" other elements or features would then be oriented "above" the other elements or features. The device may be otherwise oriented (rotated 90 degrees or at other orientations) and the spatially relative descriptors used herein interpreted accordingly.

The use of the terms "a" and "an" and "the" and similar references herein are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "and/or" includes any and all combinations of one or more of the associated listed items.

While some embodiments of the inventive concepts have been particularly shown and described with reference to embodiments thereof, it will be understood that various changes in form and details may be made therein without departing from the spirit and scope of the following claims.

What is claimed is:

1. A solid state drive apparatus, comprising:
a main body comprising a semiconductor device;
a label attached to a first portion of an exterior surface of the main body such that a second portion of the exterior surface of the main body is free of the label; and
an information marking on the label and on the second portion of the exterior surface of the main body,
wherein the label comprises more information than the information marking,
wherein the label and the information marking comprise first information and second information, respectively, that each comprise the same number that corresponds to a storage capacity of the solid state drive apparatus,
wherein the label is larger than the information marking, and
wherein the information marking comprises a groove shape extending into a first recess in the exterior surface of the main body and into a second recess in an exterior surface of the label.

2. The solid state drive apparatus of claim 1, further comprising:
an auxiliary information marking filling a groove portion of the groove shape of the information marking.

3. The solid state drive apparatus of claim 1, wherein the main body comprises a substrate on which one or more semiconductor devices are mounted.

4. The solid state drive apparatus of claim 3,
wherein the main body comprises a housing that is configured to house the substrate, and
wherein the exterior surface of the main body is an upper exterior surface of the housing.

5. The solid state drive apparatus of claim 3,
wherein the substrate comprises a first surface and a second surface that are opposite to each other,
wherein the one or more semiconductor devices are mounted on the first surface of the substrate, and
wherein the exterior surface of the main body is the second surface of the substrate.

6. The solid state drive apparatus of claim 1,
wherein the main body comprises a single semiconductor package,
wherein an external terminal is attached to a lower exterior surface of the main body,
wherein the exterior surface of the main body comprises an upper exterior surface of the main body, and
wherein the label is attached to the upper exterior surface of the main body.

7. The solid state drive apparatus of claim 3,
wherein the substrate comprises a first surface and a second surface that are opposite to each other,
wherein the one or more semiconductor devices are mounted on the first surface of the substrate, and
wherein the exterior surface of the main body is the second surface of the substrate.

8. A solid state drive apparatus, comprising:
a substrate;
a non-volatile memory device on the substrate;
a housing configured to house the substrate;
a label attached to a first portion of an upper exterior surface of the housing such that a second portion of the upper exterior surface of the housing is free of the label, the label displaying first information corresponding to a storage capacity of the solid state drive apparatus; and
an information marking comprising a first marking portion on the second portion of the upper exterior surface of the housing and comprising a second marking portion on the label, the second marking portion being connected to the first marking portion, wherein the first marking portion and the second marking portion collectively display second information corresponding to the storage capacity of the solid state drive apparatus, wherein the first information and the second information comprise the same number corresponding to the storage capacity of the solid state drive apparatus, and wherein the label is larger than the information marking.

9. The solid state drive apparatus of claim 8, wherein the first marking portion comprises a protruding shape with respect to the upper exterior surface of the housing and the second marking portion comprises a protruding shape with respect to a surface of the label.

10. The solid state drive apparatus of claim 8, wherein the first marking portion comprises a groove shape extending into the upper exterior surface of the housing and the second marking portion comprises a groove shape extending into a surface of the label, and wherein the solid state drive apparatus further comprises an auxiliary information marking filling a first groove portion of the groove shape of the first marking portion and filling a second groove portion of the groove shape of the second marking portion.

\* \* \* \* \*